US012421778B2

(12) United States Patent
Douglas et al.

(10) Patent No.: US 12,421,778 B2
(45) Date of Patent: Sep. 23, 2025

(54) ELECTRICAL LINKAGE ASSEMBLY FOR WINDOWS OR DOORS

(71) Applicant: Amesbury Industries, Inc., Edina, MN (US)

(72) Inventors: Joel Douglas, Dodge Center, MN (US); Gregory J. Vetter, Owatonna, MN (US)

(73) Assignee: Amesbury Industries, Inc., Edina, MN (US)

( * ) Notice: Subject to any disclaimer, the term of this patent is extended or adjusted under 35 U.S.C. 154(b) by 112 days.

(21) Appl. No.: 18/204,101

(22) Filed: May 31, 2023

(65) Prior Publication Data

US 2023/0392425 A1 Dec. 7, 2023

Related U.S. Application Data

(60) Provisional application No. 63/347,623, filed on Jun. 1, 2022.

(51) Int. Cl.
*E05D 15/30* (2006.01)
*E05D 11/00* (2006.01)
*E05F 11/16* (2006.01)

(52) U.S. Cl.
CPC .......... *E05D 15/30* (2013.01); *E05D 11/0081* (2013.01); *E05F 11/16* (2013.01)

(58) Field of Classification Search
CPC ................. E05D 15/30; E05D 11/0081; E05Y 2201/624; E05Y 2400/654; E05Y 2900/148; E05F 11/16
See application file for complete search history.

(56) References Cited

U.S. PATENT DOCUMENTS 3,848,361 A * 11/1974 Foster .................... H01R 35/02 439/31
4,445,299 A * 5/1984 Lehikoinen ............ H01R 35/02 439/31
5,690,501 A * 11/1997 Mader .................... H01R 35/02 439/165
6,350,956 B1 * 2/2002 Sakata ................ B60R 16/0215 174/101
6,534,713 B2 * 3/2003 Kafer .................. B60R 16/0215 296/146.7
6,812,407 B1 * 11/2004 Opperman ............. H02G 11/00 174/152 G
8,448,382 B2 * 5/2013 Rodgers .................... E06B 7/28 49/167
8,505,169 B2 * 8/2013 Wood ........................ E06B 7/28 16/374
9,660,427 B1 * 5/2017 Shah ........................ H01B 7/18
9,797,205 B2 * 10/2017 Lee ......................... F16L 3/015
9,825,443 B2 * 11/2017 Shah .................... H02G 3/0481

(Continued)

*Primary Examiner* — Justin B Rephann
(74) *Attorney, Agent, or Firm* — Merchant & Gould P.C.

(57) ABSTRACT

An electrical linkage assembly for a window or door includes a frame mount, a sash mount, a first link arm, and a second link arm. A first pivot joint is formed between the frame mount and the first link arm, a second pivot joint is formed between the first and second link arms, and a third pivot joint is formed between the second link arm and the sash mount. One or more electrical wires extend from the frame mount, through the first and second link arms and each of the first, second, third pivot joints, fully enclosed therein, and out of the sash mount.

19 Claims, 24 Drawing Sheets

(56) References Cited

U.S. PATENT DOCUMENTS

| | | | | |
|---|---|---|---|---|
| 11,822,166 | B2 * | 11/2023 | Berner | G02F 1/13306 |
| 2016/0344148 | A1 * | 11/2016 | Mullins | G02F 1/1533 |
| 2017/0005461 | A1 * | 1/2017 | Hartwig | B60R 16/0207 |
| 2017/0170776 | A1 * | 6/2017 | Janowski | H02S 20/26 |
| 2022/0035192 | A1 * | 2/2022 | Berner | E05D 15/30 |

* cited by examiner

ELECTRICAL LINKAGE ASSEMBLY FOR WINDOWS OR DOORS

CROSS-REFERENCE TO RELATED APPLICATIONS

This application claims the benefit of priority to U.S. Provisional Patent Application No. 63/347,623, filed Jun. 1, 2022, which application is hereby incorporated in its entirety by reference.

INTRODUCTION

Windows and doors may require electrical power to be transferred to the moveable window sash or door panel. For example, windows and doors may include smart glass which is a glass or glazing whose light transmission properties are altered when voltage, light, or heat is applied. In some known examples, electrical assemblies that electrically connect the moveable window sash or door panel to a frame may require substantial modifications to the window or door assembly, are difficult to conceal within the window or door assembly, and/or may limit the opening positions of the window sash or door panel. Accordingly, improvements are desired.

SUMMARY

In an aspect the technology relates to an electrical linkage assembly for a window sash mounted in a window frame, the electrical linkage assembly including: a frame mount configured to couple to the window frame; a sash mount configured to couple to the window sash; one or more link arms having a first end pivotably coupled to the frame mount and a second end pivotably coupled to the sash mount, wherein the one or more link arms are disposed in a horizontal plane; and one or more electrical wires extending from the frame mount, through the one or more link arms and fully enclosed therein, and out of the sash mount.

In an example, the one or more link arms include a first link arm and a second link arm, the first link arm pivotably coupled to the second link arm. In another example, the first link arm includes a hollow cylindrical protrusion and the second link arm includes a corresponding aperture, the hollow cylindrical protrusion received at least partially within the aperture to pivotably attach the first link arm to the second link arm. In still another example, the frame mount includes a housing and a slidable track, the first end of the one or more link arms pivotably coupled to the slidable track such that a pivot joint between the first end and the slidable track is slidable relative to the housing. In yet another example, the frame mount includes a stop projection, the stop projection extending into a path of travel of the one or more link arms to define a pivot stop. In an example, the window sash is both pivotably and translatably coupled to the window frame.

In another example, the one or more link arms include a first link arm and a second link arm, the first link arm telescopingly engaged with the second link arm. In still another example, a slack loop is included supporting at least a portion of the one or more electrical wires. In yet another example, the slack loop is disposed within the frame mount. In an example, the slack loop is disposed within the one or more link arms. In another example, the one or more link arms include a flexible armored cable.

In still another example, a connector is included terminating one or more ends of the one or more electrical wires.

In another aspect, the technology relates to an electrical linkage assembly for a window sash mounted in a window frame, the electrical linkage assembly including: a frame mount including: a housing configured to couple to the window frame and defining a longitudinal axis, wherein an elongated opening extending along the longitudinal axis is defined by the housing; a track disposed at least partially within the housing proximate the elongated opening, the track slidable relative to the housing along the longitudinal axis; a sash mount configured to couple to the window sash and defining an interior cavity; a first link arm having a first end pivotably coupled to the track of the frame mount forming a first pivot joint and a second end; a second link arm having a first end pivotably coupled to the second end of the first link arm forming a second pivot joint and a second end pivotably coupled to the sash mount forming a third pivot joint; and one or more electrical wires extending from the frame mount, through the first and second link arms and each of the first, second, third pivot joints, fully enclosed therein, and out of the interior cavity of the sash mount.

In an example, each of the first, second, and third pivot joints include a hollow cylindrical protrusion received at least partially within an aperture and forming a hollow path therein for the one or more electrical wires. In another example, a distal end of the hollow cylindrical protrusion defines a flange that snap-fits to the aperture and is freely rotatably around a pivot axis. In still another example, each of the first, second, and third pivot joints are parallel to each other. In yet another example, the first pivot joint is slidable relative to the housing. In an example, the frame mount includes one or more stop projections, the one or more stop projections extending into a path of travel of the first link arm to define a pivot stop.

In another example, a connector terminating one or more ends of the one or more electrical wires is included. In still another example, the first link arm has a different length than the second link arm. In yet another example, the first link arm is disposed on a different horizontal plane than the second link arm. In an example, the housing defines at least one cable cradle for the one or more electrical wires.

In another aspect, the technology relates to an electrical linkage assembly includes: a frame mount includes: a housing defining a longitudinal axis; and a slider disposed at least partially within the housing and slidable relative to the housing along the longitudinal axis, the slider having a boss projecting at least partially from the housing; a sash mount; a first link arm having a first end and an opposite second end; and a second link arm having a first end and an opposite second end, wherein the first link arm is pivotably connected between the boss of the slider and the second link arm, and the second link arm is pivotably connected between the first link arm and the sash mount, such that an open path is formed from the frame mount to the sash mount, through the first and second link arms, and configured to receive at least one electrical wire, and wherein each pivot connection is formed from a hollow cylindrical protrusion received at least partially within an aperture and defining a pivot axis.

In an example, each pivot connection is freely rotatable around the pivot axis. In another example, each pivot connection is reinforced with a spool extending along the pivot axis. In still another example, the first and second ends of the first link arm include first end caps coupled to a first link arm body and the first and second ends of the second link arm include second end caps coupled to a second link arm body, the first and second end caps having one of the hollow cylindrical protrusion and the aperture. In yet another example, the first end caps are different than the second end caps. In an example, the first and second link arm bodies have two separate channels defined therein.

In another aspect, the technology relates to a window assembly including: a window frame; a window sash pivotably and translatable mounted to the window frame; and an electrical linkage assembly coupled between the window frame and the window sash for running one or more electrical cables between the window frame and the window sash, the electrical linkage assembly including: a frame mount including: a housing defining a longitudinal axis; and a slider slidably coupled to the housing and slidable along the longitudinal axis; a sash mount; a first link arm having a first end pivotably coupled to the slider of the frame mount forming a first pivot joint and a second end, the first pivot joint moveable along the longitudinal axis; and a second link arm having a first end pivotably coupled to the second end of the first link arm forming a second pivot joint and a second end pivotably coupled to the sash mount forming a third pivot joint.

In an example, the electrical linkage assembly further includes a side jamb mount discrete from the frame mount and configured to receive at least a portion of the one or more electrical cables. In another example, the housing includes the one or more stop projections extending into a path of travel of the first link arm to define a pivot stop for the first pivot joint. In still another example, the frame mount is disposed above the first link arm and the sash mount is disposed below the second link arm.

BRIEF DESCRIPTION OF THE DRAWINGS

There are shown in the drawings, examples that are presently preferred, it being understood, however, that the technology is not limited to the precise arrangements and instrumentalities shown.

DETAILED DESCRIPTION

The examples described herein provide an electrical linkage assembly for the protection of, and transfer thereof, electrical wiring from a hinged window or door frame to the moving window or door panel. In examples, the electrical wiring may transfer power and/or data through the electrical wiring. The electrical linkage assembly is configured to be used with an existing window or door hinge such that support loads need not be transferred through the assembly. Rather, the assembly has a compact design with a large range of motion so that the electrical wiring is protected as it extends from the frame to the window or door. In examples, the electrical linkage assembly is freely pivotable around its joints so that the window or door can both pivot and translate within the frame without limitation.

The electrical linkage assembly may include a frame mount configured to couple to a frame and a sash mount configured to couple to the window sash or door. One or more link arms are pivotably coupled between the frame mount and the sash mount. The link arms are hollow so that one or more electrical wires can extend into the frame mount, through the link arms, and out of the sash mount for protection. In an aspect, the pivot joints of the electrical linkage assembly are formed from a cylindrical protrusion and a corresponding aperture so that the electrical wires can extend through the joints without excessive bends and tension or compression. In another aspect, the pivot joint at the frame mount is configured to translate so as to accommodate window sash or door movement.

Figure 1:
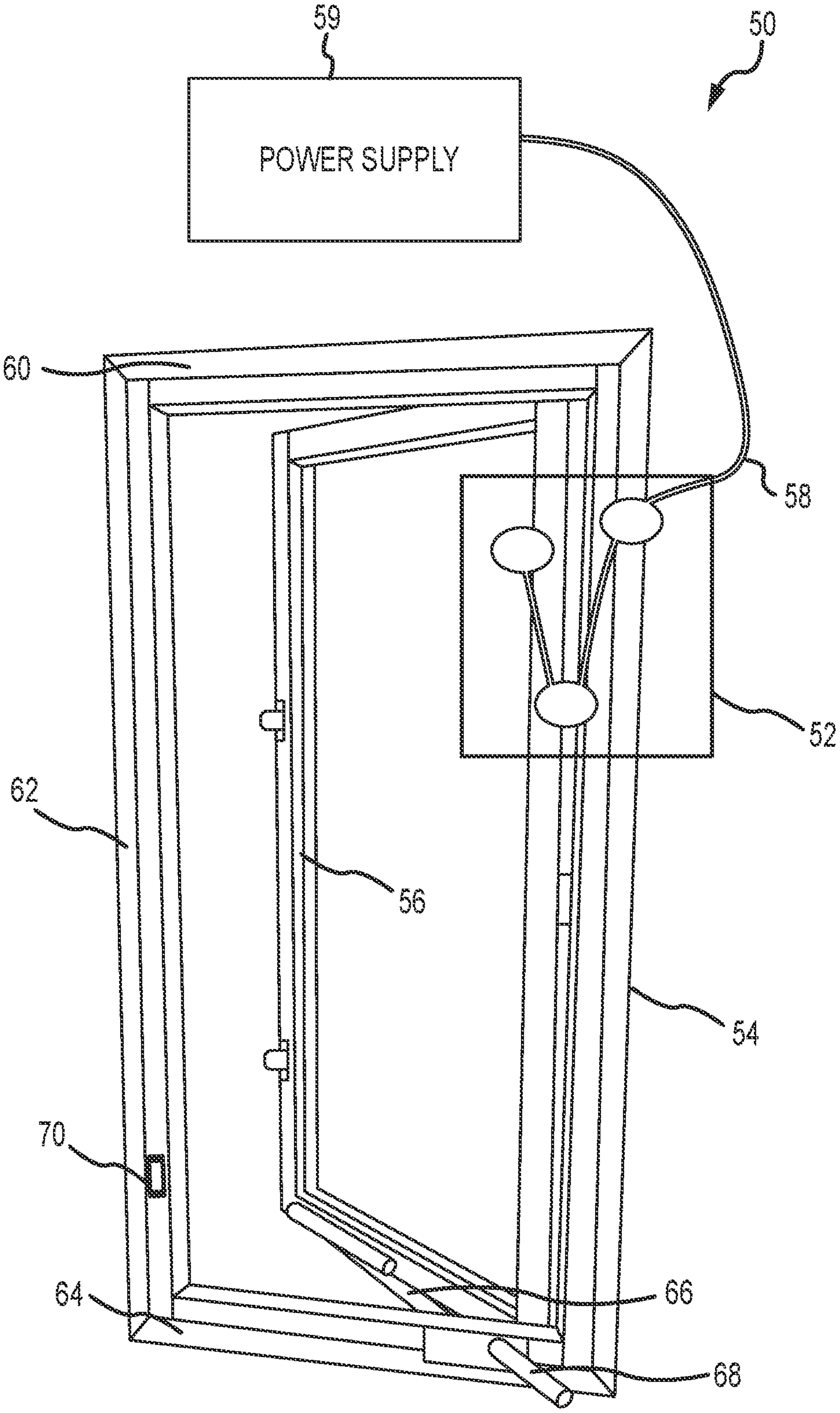
FIG. 1 is a perspective view of an exemplary casement window with a schematic of an exemplary electrical linkage assembly.

The FIG. 1 is a perspective view of an exemplary casement window 50 with a schematic of an exemplary electrical linkage assembly 52. The casement window 50 includes a frame 54 and a window sash 56. The window sash 56 is pivotably and/or translatably coupled to the frame 54 and with electrical power and/or electrical communication 58 connected to a power supply 59 (e.g., structure line power, a battery, or the like) between the window sash 56 and the frame 54. The electrical power and/or electrical communication 58 is housed within the electrical linkage assembly 52 which provides protection and support thereof.

The frame 54 includes a head jamb 60, a pair of side jambs 62, and a sill 64. The window sash 56 is pivotably mounted to the frame 54 on one side so that an operating arm 66 having an operating handle 68 can be used to open and close the window sash 56. A locking handle 70 is also included to lock the window sash 56 in the closed position. In examples, the window sash 56 is only pivotable to open the window. In other examples, the window sash 56 may be both pivotable and translatable along the head jamb 60 and sill 64 to open the window. As such, the electrical linkage assembly 52 is configured for use in either type of casement window system.

The electrical linkage assembly 52 is independent and separate from the operating arm 66 and handle 68. The electrical linkage assembly 52 is a passive system for the electrical power and/or electrical communication 58 and does not need to be separately operable; rather, the electrical linkage assembly 52 moves with the window sash 56 as it is operated by the operating arm 66 and handle 68. The electrical linkage assembly 52 may be mounted either at the head jamb 60 or at the sill 64 as required or desired. The configurations of the electrical linkage described herein enable a wide range of motion such that the same or similar configuration can be used in a wide variety of window systems.

Figure 2:
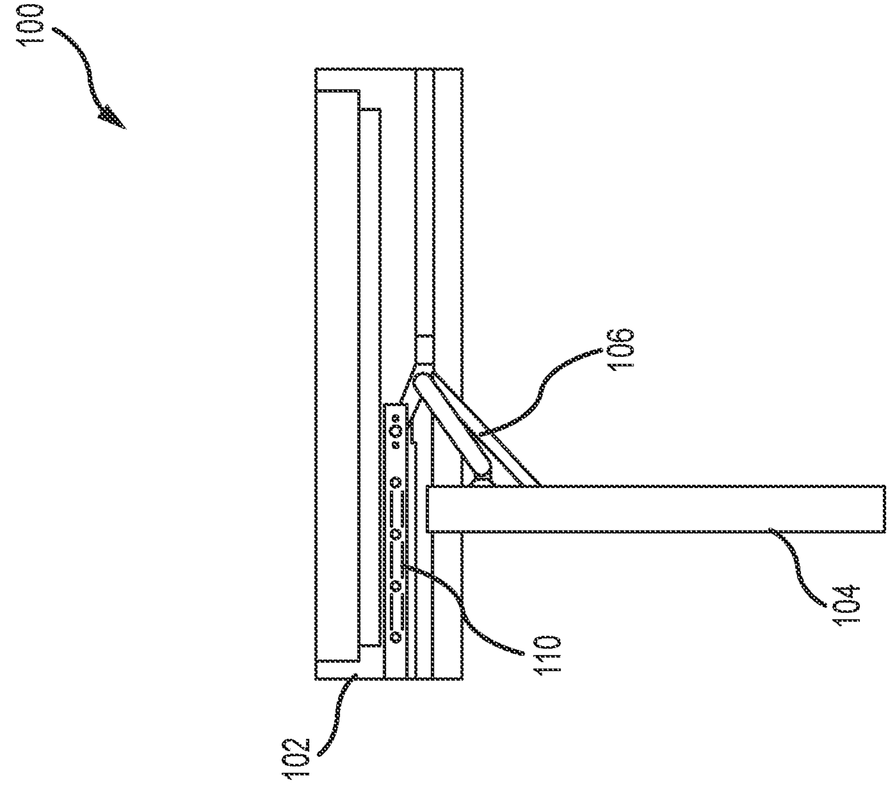
FIG. 2 is a plan view of another casement window in an open position with an exemplary electrical linkage assembly.

FIG. 2 is a plan view of another casement window 100 in an open position with an exemplary electrical linkage assembly 110. The casement window 100 includes a window frame 102 (e.g., a header, a sill, and side jambs) with a window sash 104 mounted thereto. The window sash 104 is mounted to the window frame 102 with a hinge 106 that allows a user to open and close the window sash 104 relative to the window frame 102 as required or desired and known in the art. As illustrated in FIG. 2, the open position of the window sash 104 may be around a 900 angle relative to the plane of the window frame 102 and is at least partially defined by the configuration of the hinge 106. When the window sash 104 is being moved between open and closed positions (the closed position is not shown), the window sash 104 both pivots relative to the window frame 102 and translates along the plane of the window frame 102. In other examples, the window sash 104 may only pivot relative to the window frame 102 as required or desired.

The window sash 104 may require electrical coupling, for example, but not limited to, use of smart glass (e.g., privacy glass, tinted glass, and/or solar glass) or the like. As used herein, electrical coupling includes both electrical power and/or electrical communication (e.g., signals or data) coupling for the window sash 104. As such, the electrical linkage assembly 110 is mounted to the window 100, separate from the hinge 106, so that one or more electrical wires can be routed through the electrical linkage assembly 110 and reach the window sash 104 without inhibiting operation of the hinge 106.

Figure 3:
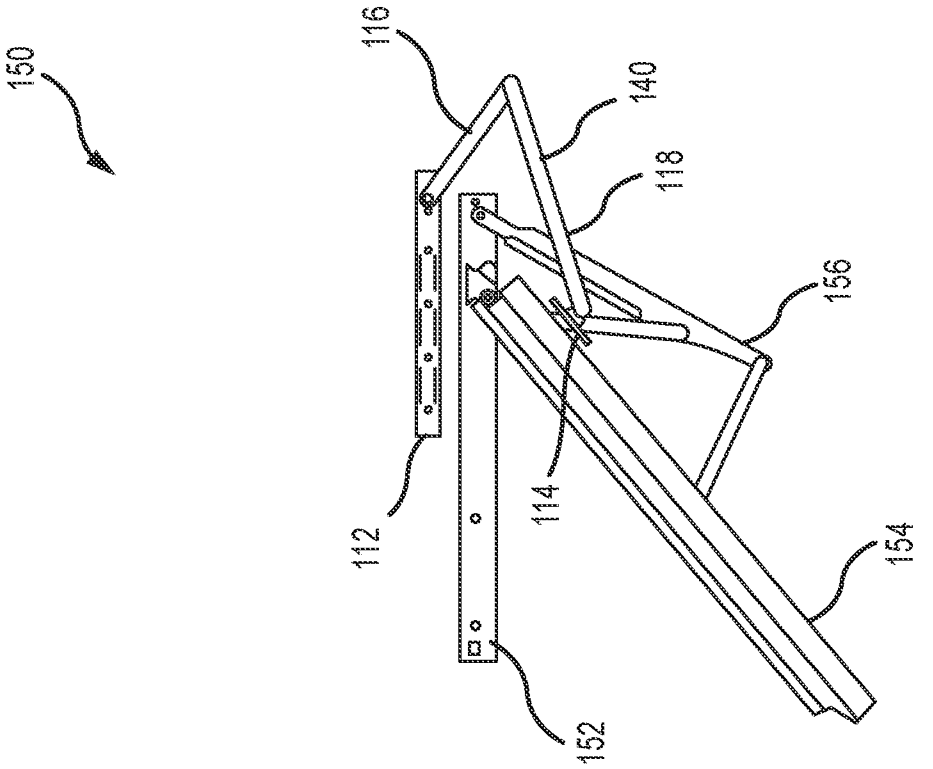
FIG. 3 is a plan view of another casement window in an open position with an exemplary electrical linkage assembly.

FIG. 3 is a plan view of another casement window 150 in an open position with another electrical linkage assembly 140. The casement window 150 includes a window frame (not shown) with a window sash 154 mounted thereto. The window sash 154 is mounted to the window frame with a hinge 156 having a track 152 that allows a user to open and close the window sash 154 relative to the window frame with the track 152 supported thereon as required or desired and known in the art. As illustrated in FIG. 3, the open position of the window sash 154 may be greater than a 900 angle relative to the plane of the window frame and is at least partially defined by the configuration of the hinge 156. In an aspect, the open position of the window sash 154 may be up to 140°. When the window sash 154 is being moved between open and closed positions (the closed position is not shown), the window sash 154 both pivots relative to the window frame and translates along the plane of the window frame. In other examples, the window sash 154 may only pivot relative to the window frame as required or desired.

Referring concurrently to FIGS. 2 and 3, the electrical linkage assemblies 110, 140 are similar and each includes a frame mount 112 configured to couple to the window frame 102, a sash mount 114 configured to couple to the window sash 104, 154, and one or more link arms 116, 118. One or more electrical wires (not shown) are routed through the window frame 102 into the frame mount 112, routed through multiple pivot joints and the link arms 116, 118, and out through the sash mount 114 and into the window sash. As the window sash 104, 154 opens, the link arms 116, 118 articulate outwards and move/pivot according to the rotating and translating motion of the window sash 104, 154 and the hinge 106, 156 used. The electrical wires routed through the electrical linkage assemblies 110, 140 are protected from wear, moisture, and kinking, however, the electrical wires may bend and/or twist but have relatively little translating motion during the movement of the window sash 104, 154.

The electrical wiring can enter through the window frame 102 for example, on the hinge side of the frame or at the top of the frame. As such, the electrical linkage assemblies 110, 140 may be mounted at the top of the window frame 102 so as to be at least partially concealed in the head jamb and may be completely hidden in a closed position. In other aspects, the electrical linkage assemblies 110, 140 may be mounted at the bottom of the window frame 102 as required or desired. The electrical linkage assemblies 110, 140 allow for the routing and protection of the electrical wires between the window frame 102 and the window sash 104, 154. The electrical linkage assemblies 110, 140 enable the window sash 104, 154 to be electrically coupled in both an open position and a closed position. Additionally, the electrical linkage assemblies 110, 140 are easy to install and without compromising existing window assembly performance. In examples, the electrical linkage assemblies 110, 140 may be coupled adjacent to the hinge, or may be disposed on the opposite side of the window sash from the hinge. In other examples, the electrical linkage assemblies 110, 140 may include electrical quick connectors for increasing serviceability. By including both a hinge and the electrical linkage assemblies 110, 140, the hinge retains its load bearing characteristics and little to no load needs to be transferred through the electrical linkage assemblies 110, 140.

As illustrated in FIG. 2, the frame mount 112 is elongated so that the electrical wires can run from the side of the window frame and fully within the frame mount 112. As illustrated in FIG. 3, the frame mount 112 may be positioned at any location along the top of the window frame to accommodate the electrical wires running along the top. In some examples, the frame mount 112 shown in FIG. 3 can be further elongated and extend to the side of the window frame as required or desired. The frame mount 112 includes a floating frame pivot that reduces link arm binding and increasing applicability to different window systems. The link arms 116, 118 have interlocking pivots to reduce water ingress and different arm lengths can be used to accommodate different window systems. The link arms 116, 118 may have different lengths to accommodate different swing configurations of the casement windows. For example, the link arms in the electrical linkage assembly 140 may be longer than in the electrical linkage assembly 110. The electrical linkage assemblies facilitate a full range of sash movement as described herein.

While a casement window is illustrated in FIGS. 1-3, it should be appreciated that the electrical linkage assemblies described herein can be used with any type of pivoting and/or pivoting and translating window assembly (e.g., casement or awning). In other aspects, the electrical linkage assemblies described herein can be used with door assemblies (not shown) as required or desired. The electrical linkage assemblies may fit within existing window and door profiles so that the window and door systems do not require recertification. Examples of electrical linkage assemblies are described further below in reference to FIGS. 4-26.

Figure 4:
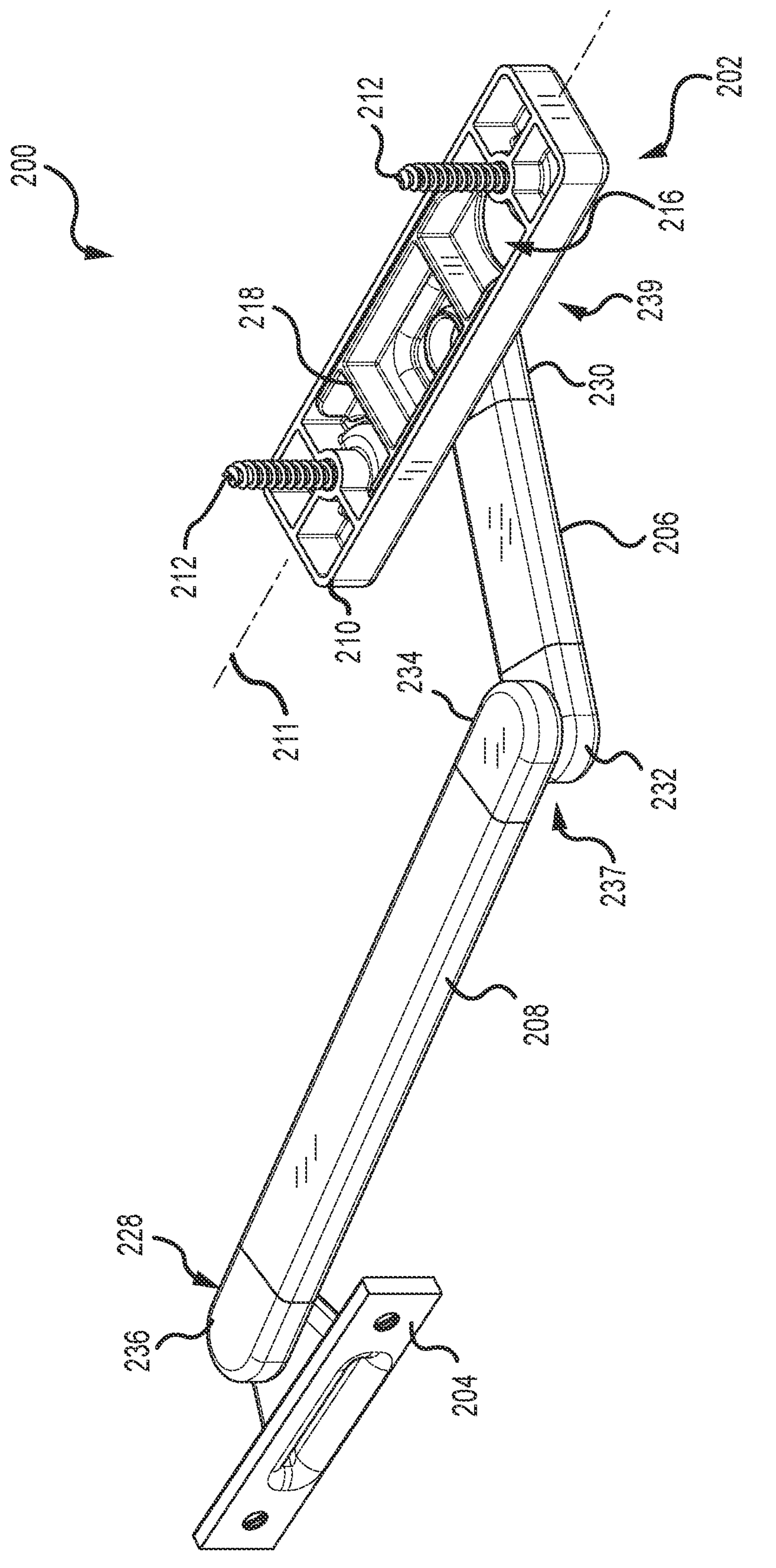
FIG. 4 is a perspective view of another electrical linkage assembly.
Figure 5:
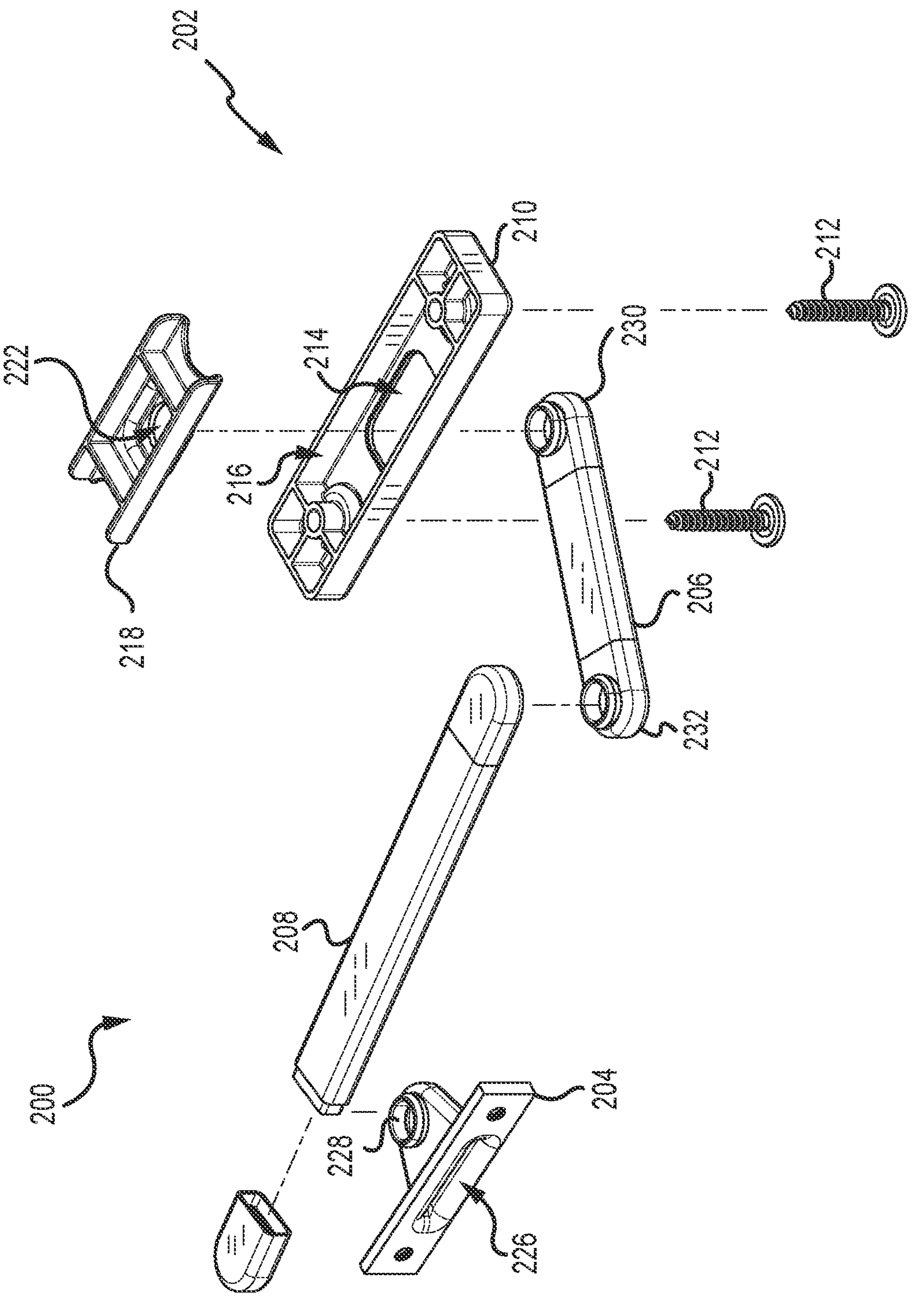
FIG. 5 is an exploded perspective view of the electrical linkage assembly shown in FIG. 4.
Figure 6:
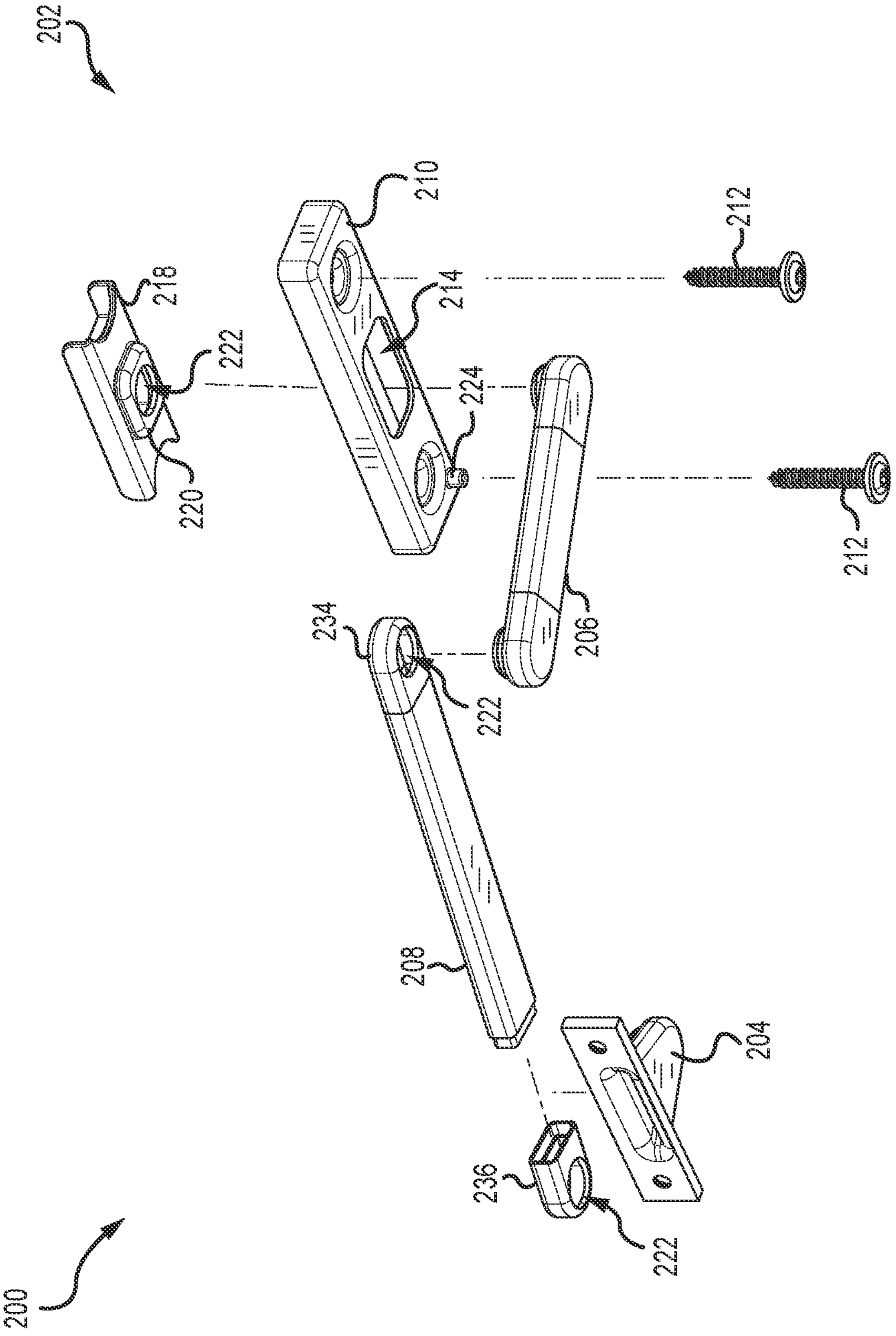
FIG. 6 is another exploded perspective view of the electrical linkage assembly shown in FIG. 4.

FIG. 4 is a perspective view of another electrical linkage assembly 200. FIG. 5 is an exploded perspective view of the electrical linkage assembly 200. FIG. 6 is another exploded perspective view of the electrical linkage assembly 200. Referring concurrently to FIGS. 4-6, the electrical linkage assembly 200 includes a frame mount 202 configured to couple to the window frame, a sash mount 204 configured to couple to the window sash, and a pair of link arms 206, 208 that define an enclosed channel and allow one or more electrical wires to be routed therethrough. The pair of link arms 206, 208 are similar to the configuration of the electrical linkage assembly 110 (shown in FIGS. 2 and 3).

The frame mount 202 includes a housing 210 configured to attach to the window frame with one or more fasteners 212. The housing 210 defines a longitudinal axis 211 that extends in the same direction as the head jamb or sill. The housing 210 includes an elongated opening 214 extending along the longitudinal axis 211 and a recess 216 configured to house a slidable track 218. The housing 210 can take any size and/or shape as required or desired. The housing 210 may be smaller in size along the longitudinal axis 211 so as to mount at the location of the electrical wires at the top of the window frame. In contrast, the housing 210 may be elongated along the longitudinal axis 211 (e.g., as shown in the examples illustrated in FIGS. 2 and 3) so that the electrical wires can run from a side of the window frame and within the housing 210.

The slidable track 218 is disposed at least partially within the housing 210 and slidably mounted to the housing 210 so that it can slide relative thereto along the longitudinal axis 211. The slidable track 218 includes a protruding boss 220 defining an aperture 222. The protruding boss 220 is received at least partially by the elongated opening 214. The aperture 222 of the slidable track 218 is configured to pivotably couple to one end of the first link arm 206 and so that the first link arm 206 can rotate around an axis defined by the aperture 222 and the pivot joint (e.g., the slidable track 218 and the first link arm 206) can longitudinally slide relative to the housing 210. This floating pivot joint at the frame mount 202 provides extra motion to the link arms 206, 208 to reduce or prevent binding of the link arms during opening and closing of the window sash through its full range of motion. In other examples (not illustrated), the slidable track 218 may be slidable transverse to the longitudinal axis 211.

The housing 210 includes a stop projection 224 that extends into a path of travel of the first link arm 206 so as to define a pivot stop and prevent over-rotation of the first link arm 206 relative to the frame mount 202. Because all of the pivot points of the electrical linkage assembly 200 are freely rotatable, to maintain the rotational configuration of the link arms 206, 208 relative to the window assembly, the stop projection 224 prevents the first link arm 206 from rotating inward of the frame mount 202 and keeps the link arms 206, 208 outward of the frame mount 202. In the example, the stop projection 224 is disposed on the opposite side of the housing 210 than the extension of the link arm 206. In an aspect, a pair of stop projections 224 (not shown), one on each longitudinal end of the housing 210, may be included.

Figure 17:
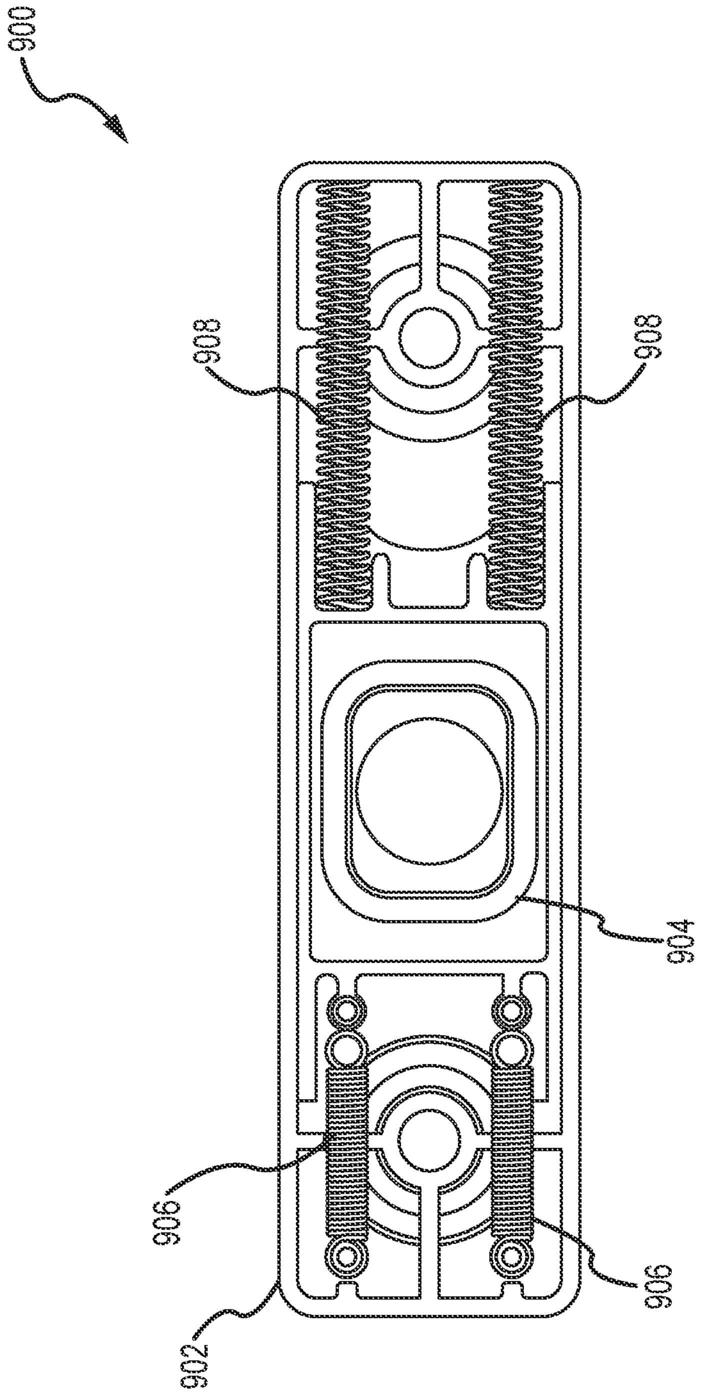
FIG. 17 is a plan view of a frame mount for use with the electrical linkage assembly shown in FIGS. 4-7.

Additionally, or alternatively, a biasing spring (e.g., leaf spring(s), compression spring(s), extension spring(s)—not shown) may be included within the housing 210 and engaged with the first link arm 206 so as to bias the rotational position of the link arms 206, 208. For example, FIG. 17 illustrates a plan view of an alternative frame mount 900 for use with the electrical linkage assembly 200 shown in FIGS. 4-7 or other assemblies described herein. The frame mount 900 has a housing 902 with a slidable track 904 that couples to the link arms therein. On one side of the slidable track 904, a pair of extension spring 906 may be used to bias the slidable track 904 to one side of the elongated opening in the housing 902 and prevent the first link arm from rotating inward of the frame mount. Additionally, or alternatively, a pair of compression springs 908 may be disposed on the opposite side of the slidable track 904 to bias the position of the slidable track 904 within the housing 902. The springs 906, 908 are coupled between the housing 902 and the slidable track 904 so as to generate the biasing force as described herein.

Referring back to FIGS. 4-6, the sash mount 204 has a body that is configured to attach to the window sash (e.g., with fasteners—not shown). The body forms an interior cavity 226 so that the electrical wires can be routed into the window sash. The body also defines a pivot joint 228 for the second link arm 208 that pivotably couples thereto. In the example, the pivot joint 228 is formed as a hollow cylindrical protrusion so that the electrical wires can pass therethrough. A distal end of the hollow cylindrical protrusion includes a tapered flange 229 (shown in FIG. 7) so that the second link arm 208 can snap connect to the pivot joint 228 with an aperture and freely rotate therearound. The tapered flange also prevents water ingress into the electrical linkage assembly 200. The snap-fit connection facilitates the second link arm 208 connecting to the sash mount 204 while allowing for the electrical wires to pass therethrough. The snap-fit connection is also utilized for the other pivot point in the electrical linkage assembly 200 and described further below. In aspects, a seal (not shown) may be includes at the pivot joint 228.

The first link arm 206 has a first end 230 that pivotably couples to the slidable track 218 and an opposite second end 232 that pivotably couples to the second link arm 208. The second link arm 208 also has a first end 234 that pivotably couples to the first link arm 206 and an opposite second end 236 that pivotably couples to the sash mount 204. As such, a pivot joint 237 is formed between the first and second link arms 206, 208 and a pivot joint 239 is formed between the first link arm 206 and the frame mount 202. Each link arm 206, 208 is a hollow tubular structure so that electrical wires can run therethrough. In the example, each link arm 206, 208 has a substantially rectangular cross-section. The first link arm 206 may have a different length than the second link arm 208 so as to enable movement of the electrical linkage assembly 200 as described herein. In an aspect, the first link arm 206 may have a shorter length than the second link arm 208.

The ends 230, 232 of the first link arm 206 define the pivot points for the link arm 206. In the example, each end 230, 232 is formed from an attachable end cap which defines a hollow cylindrical protrusion so that the electrical wires can pass therethrough. A distal end of the hollow cylindrical protrusion includes the tapered flange 229 so that both the second link arm 208 and the slidable track 218 can snap connect to the pivot points and rotate therearound. By forming the pivot points on the cap end, the length of the first link arm 206 can be sized based on the window assembly configuration.

Similarly, the ends 234, 236 of the second link arm 208 define the pivot points for the link arm 208. In the example, each end 234, 236 is formed from an attachable end cap which defines the aperture 222 that receives the hollow cylindrical protrusion of the first link arm 206 and the sash mount 204. By forming the pivot points on the end cap, the length of the second link arm 208 can be sized based on the window assembly configuration while maintaining a similar pivot joint. By having discrete ends that couple to the body of the link arms 206, 208, the length of the link arms may easily be changed to accommodate different window systems and sizes.

In the example, the ends 230, 232 of the first link arm 206 are similar and both including the hollow cylindrical protrusion with a flange. In other examples, the ends 230, 232 of the first link arm 206 may include an aperture to receive the protrusion. In still other examples, the ends 230, 232 may be different with one having the protrusion and one having the aperture. Similarly, the ends 234, 236 of the second link arm 208 are similar and both include the aperture. In other examples, the ends 234, 236 of the second link arm 208 may include the hollow cylindrical protrusion with a flange. In still other examples, the ends 234, 236 of the second link arm 208 may be different with one having the protrusion and one having the aperture.

Figure 7:
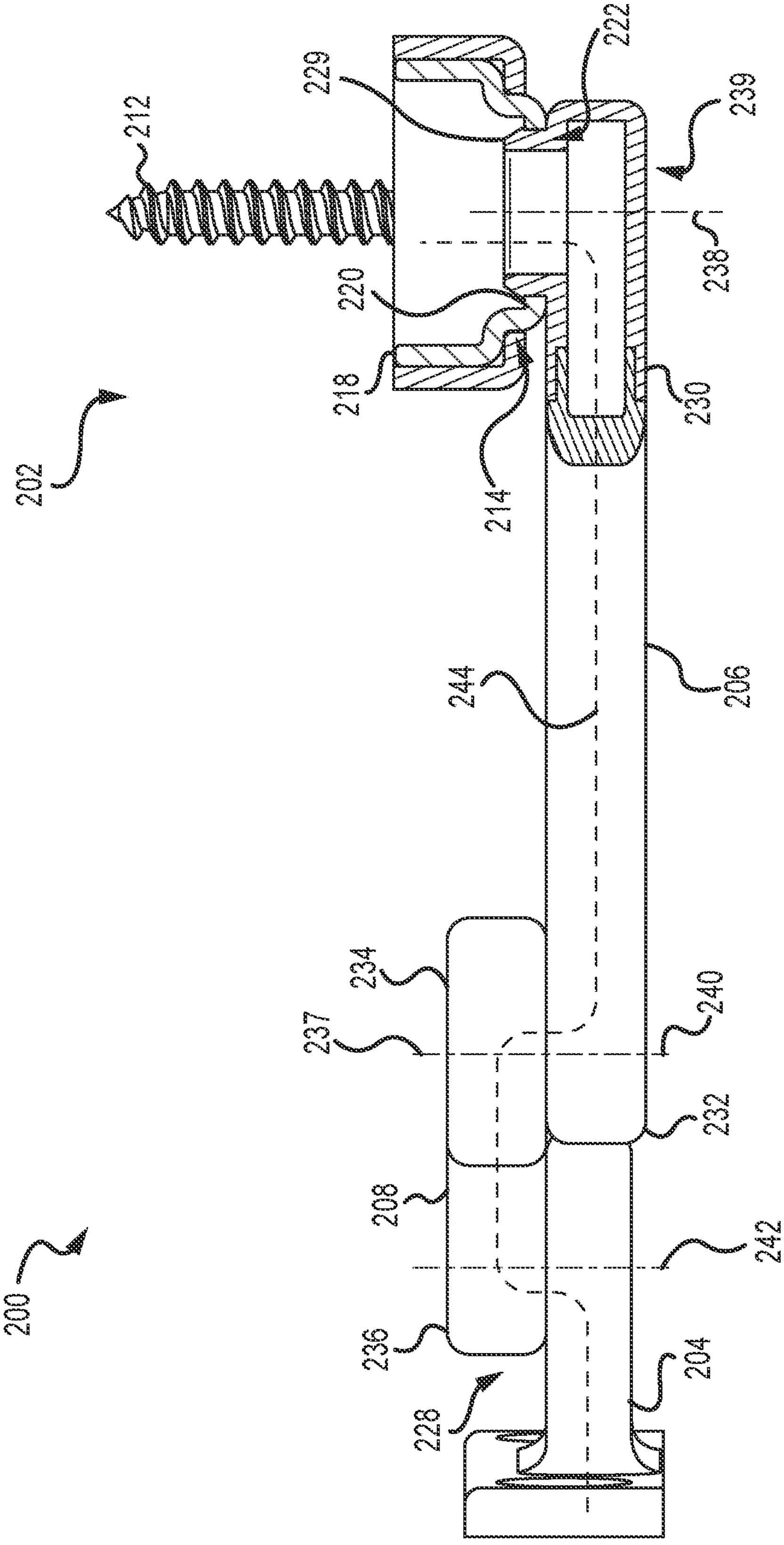
FIG. 7 is a cross-sectional view of the electrical linkage assembly shown in FIG. 4.

FIG. 7 is a cross-sectional view of the electrical linkage assembly 200. Certain components are described above and are not necessarily described further. As illustrated in FIG. 7 the cross-sectional view is taken at the pivot joint 239 between the first end 230 of the first link arm 206 and the frame mount 202. The cylindrical projection of the first end 230 can snap into the aperture 222 in the slidable track 218 and a pivot axis 238 is formed. Due to the construction of the pivot joint 239, the pivot axis 238 is an open channel so that electrical wires can extend through the pivot joint 239. Similar pivot axes are formed between the first link arm 206 and the second link arm 208 at 240 and the pivot joint 237, and between the second link arm 208 and the sash mount 204 at 242 and the pivot joint 228. The pivot axis 240 is a moveable axis because the link arms 206, 208 are moveable, while the axis 238 is fixed to window frame (although the slidable track 218 does allow for some translating movement) and the axis 242 is fixed to the window sash.

In the example, each pivot joint is freely rotatable around the pivot axis with only exterior structures providing any pivot stops. Each pivot axis 238, 240, 242 is parallel and orthogonal to the longitudinal axis 211 (shown in FIG. 4) of the housing 210.

The components of the electrical linkage assembly 200 forms an open path (shown schematically at 244) that enables electrical wires to extend between the window frame and window sash as described above while being fully enclosed therein and protected. The path 244 is relatively smooth, free from any angles greater than 90°, and devoid of any structure that the electrical wires can bind around and/or get caught on so that movement of the electrical linkage assembly 200 is not inhibited. Additionally, the length of the link arms 206, 208 are fixed such that the electrical wires are reduced from axially sliding along the path 244 and further reduce binding and catching of the electrical wires.

In the example, the second link arm 208 is stacked above the first link arm 206 on a different horizontal plane and a height of the link arms 206, 208 are approximately equal. This configuration reduces the overall height of the electrical linkage assembly 200 and reduces interference with the existing structure of the window assembly. In an aspect, the electrical linkage assembly 200 may be sized to fit within a one-inch vertical space of the window assembly. The first link arm 206 may be horizontally aligned with the sash mount 204, while the second link arm 208 may be horizontally aligned with the frame mount 202. The frame mount 202 is disposed above the first link arm 206 and the sash mount 204 is disposed below the second link arm 208.

Figure 8:
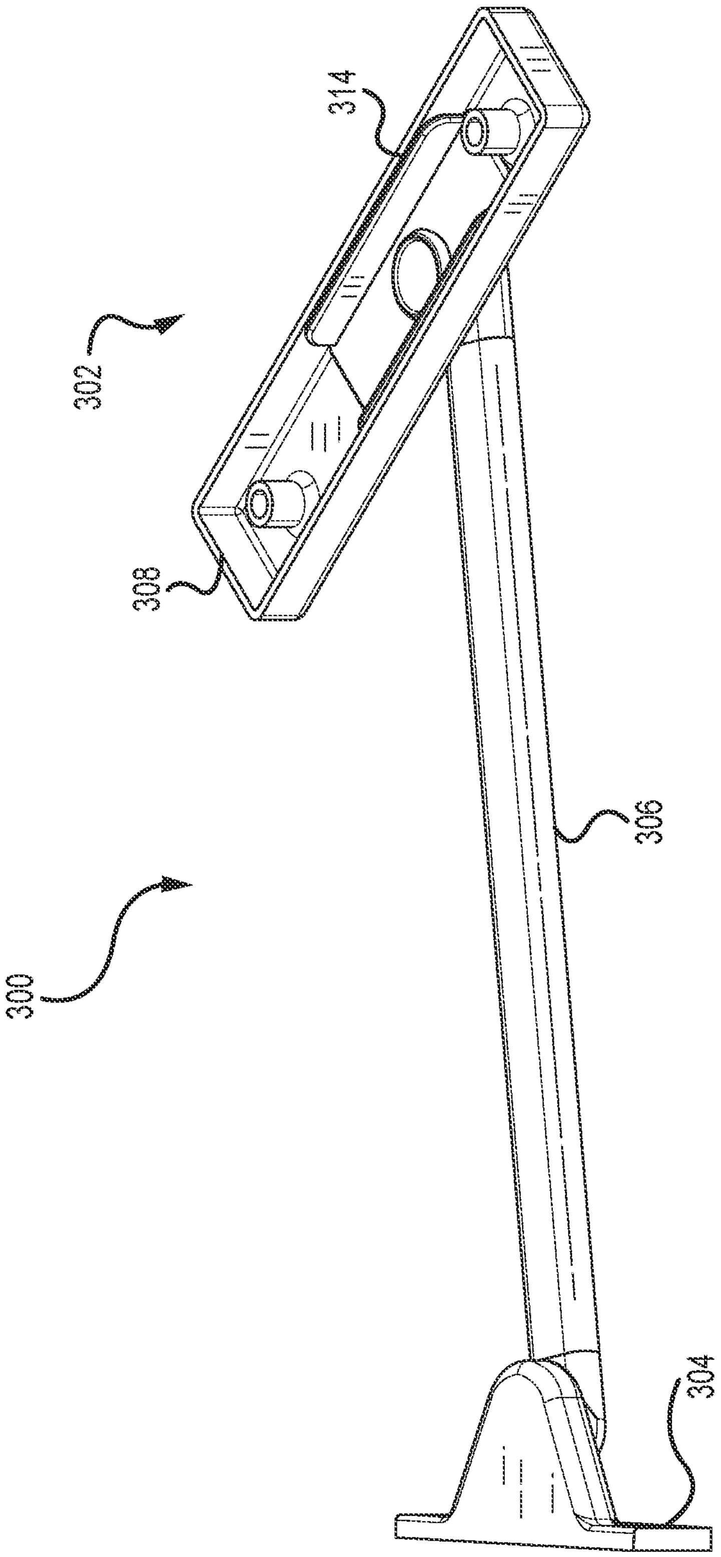
FIG. 8 is a perspective view of another electrical linkage assembly.
Figure 9:
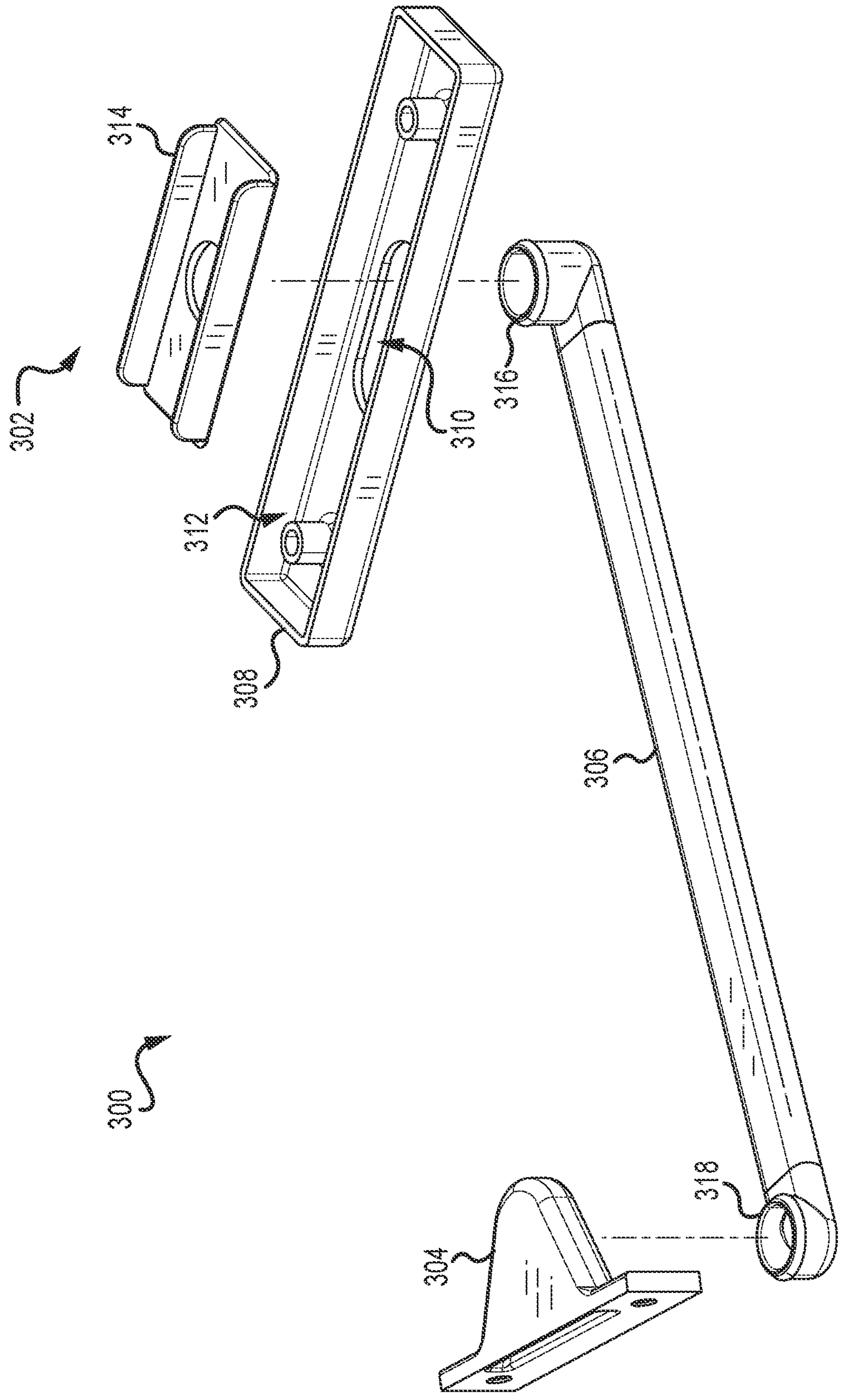
FIG. 9 is an exploded perspective view of the electrical linkage assembly shown in FIG. 8.

FIG. 8 is a perspective view of another electrical linkage assembly 300. FIG. 9 is an exploded perspective view of the electrical linkage assembly 300. Referring concurrently to FIGS. 8 and 9, electrical linkage assembly 300 includes a frame mount 302 configured to couple to the window frame, a sash mount 304 configured to couple to the window sash, and a single link arm 306 that defines an enclosed channel and allows one or more electrical wires to be routed therethrough. The frame mount 302 includes a housing 308 configured to attach to the window frame with one or more fasteners (not shown). The housing 308 includes an elongated opening 310 and a recess 312 configured to house a slidable track 314. The sash mount 304 has a body that is configured to attach to the window sash with one or more fasteners (not shown). The body forms an interior cavity so that the electrical wires can be routed into the window sash.

In this example, the link arm 306 has a first end 316 that pivotably couples to the slidable track 314 and an opposite second end 318 that pivotably couples to the sash mount 304. The link arm 306 is a hollow tubular structure so that electrical wires can run therethrough. The ends 316, 318 of the link arm 306 define the pivot points for the link arm 306. In the example, each end 316, 318 is formed from an attachable cap which defines a hollow cylindrical protrusion so that the electrical wires can pass therethrough. A distal end of the hollow cylindrical protrusion includes a tapered flange so that both the sash mount 304 and the slidable track 314 can snap connect to the pivot points and rotate therearound. By forming the pivot points on the cap end, the length of the link arm 306 can be sized based on the window assembly configuration. In this example, the link arm 306 is on a different horizontal plane than the frame mount 302 and the sash mount 304.

Figure 10:
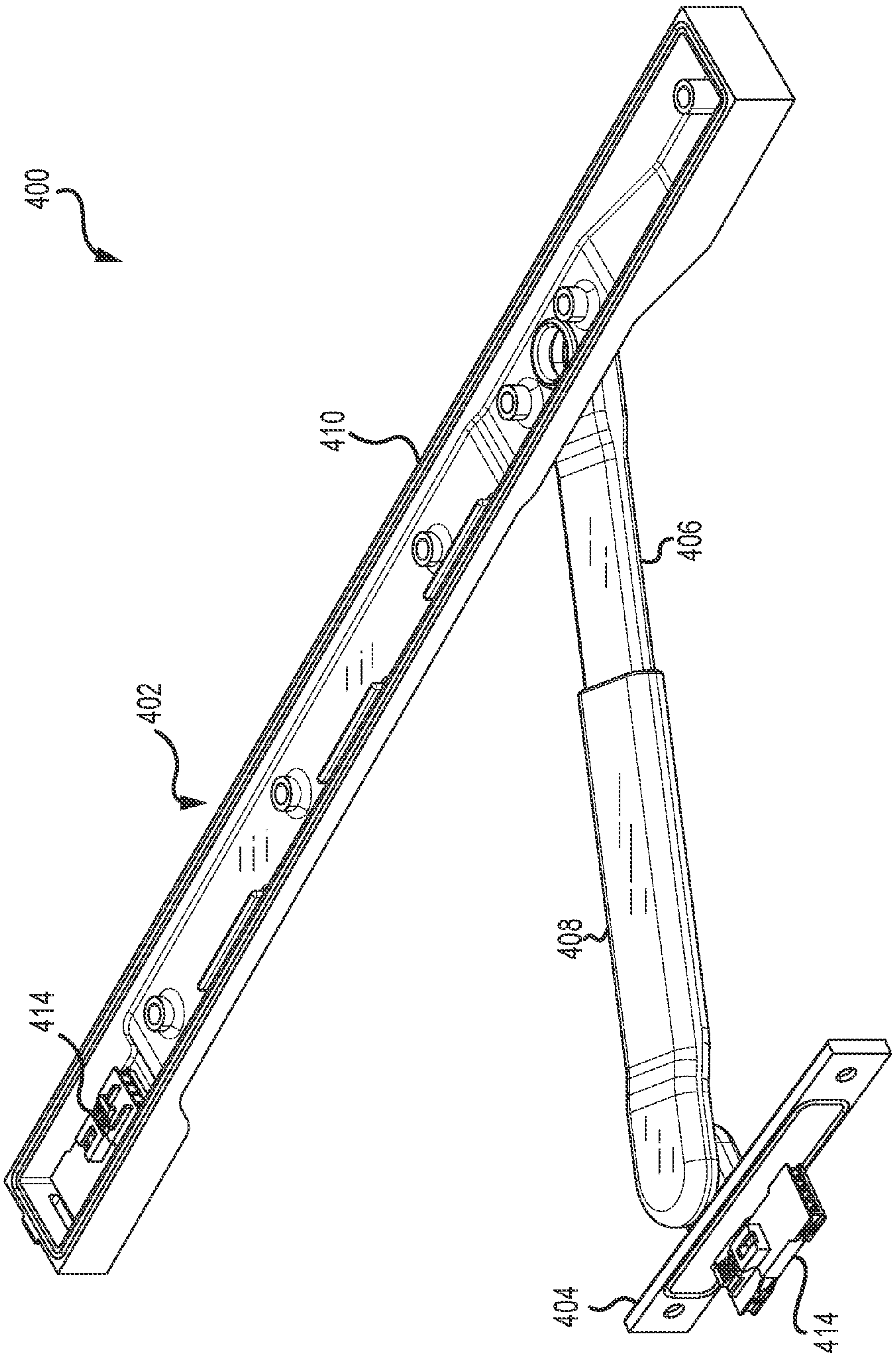
FIG. 10 is a perspective view of another electrical linkage assembly.
Figure 11:
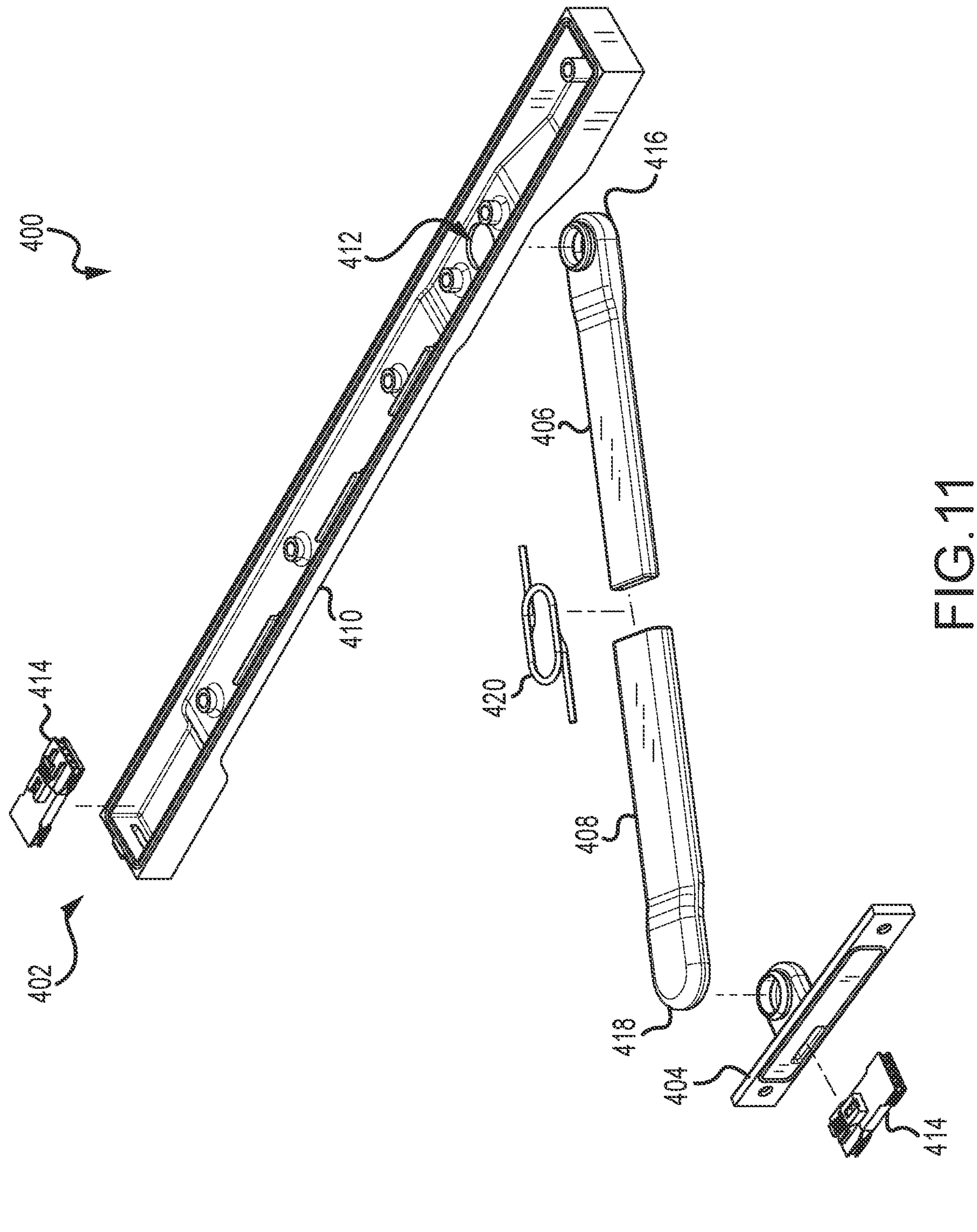
FIG. 11 is an exploded perspective view of the electrical linkage assembly shown in FIG. 10.

FIG. 10 is a perspective view of another electrical linkage assembly 400. FIG. 11 is an exploded perspective view of the electrical linkage assembly 400. Referring concurrently to FIGS. 10 and 11, electrical linkage assembly 400 includes a frame mount 402 configured to couple to the window frame, a sash mount 404 configured to couple to the window sash, and a pair of link arms 406, 408 that defines an enclosed channel and allow one or more electrical wires to be routed therethrough. The frame mount 402 includes a housing 410 configured to attach to the window frame with one or more fasteners. The housing 410 includes an aperture 412 configured to connect to the first link arm 406. The sash mount 404 has a body that is configured to attach to the window sash with one or more fasteners (not shown). The body forms an interior cavity so that the electrical wires can be routed into the window sash. In this example, both the frame mount 402 and the sash mount 404 include a connector 414 for terminating the ends of the electrical wires.

In this example, the first link arm 406 is telescopingly engaged with the second link arm 408 so that an overall length is adjustable to accommodate window sash movement. The first link arm 406 has a first end 416 that pivotably couples to the housing 410, while the second link arm 408 has an opposite second end 418 that pivotably couples to the sash mount 404. The link arms 406, 408 are a hollow tubular structure so that electrical wires can run therethrough. The ends 416, 418 define the pivot points. Because the link arms 406, 408 change length during movement of the window sash, a slack loop 420 can be disposed within the link arms 406, 408 so as to support the electrical wires therein. In an example, the slack loop 420 is a resilient wire-like structure that the electrical wires are coupled to, and when the length of the link arms 406, 408 extends, the slack loop 420 contracts so that the length of the electrical wires are also extended. When the length of the link arms 406, 408 retracks, the slack loop 420 returns to its home position and collects the excess length of the electrical wires. As such, the slack loop 420 facilitates electrical wires support during movement of the link arms 406, 408 and so that the electrical wires are prevented from binding and tangling therein. In other examples, the slack loop 420 may not include a resilient structure and merely be an extra wrap or wraps length of electrical wire positioned within the link arms 406, 408. This configuration is in contrast to the examples above, wherein the length of the link arms remains constant during movement.

Figure 12:
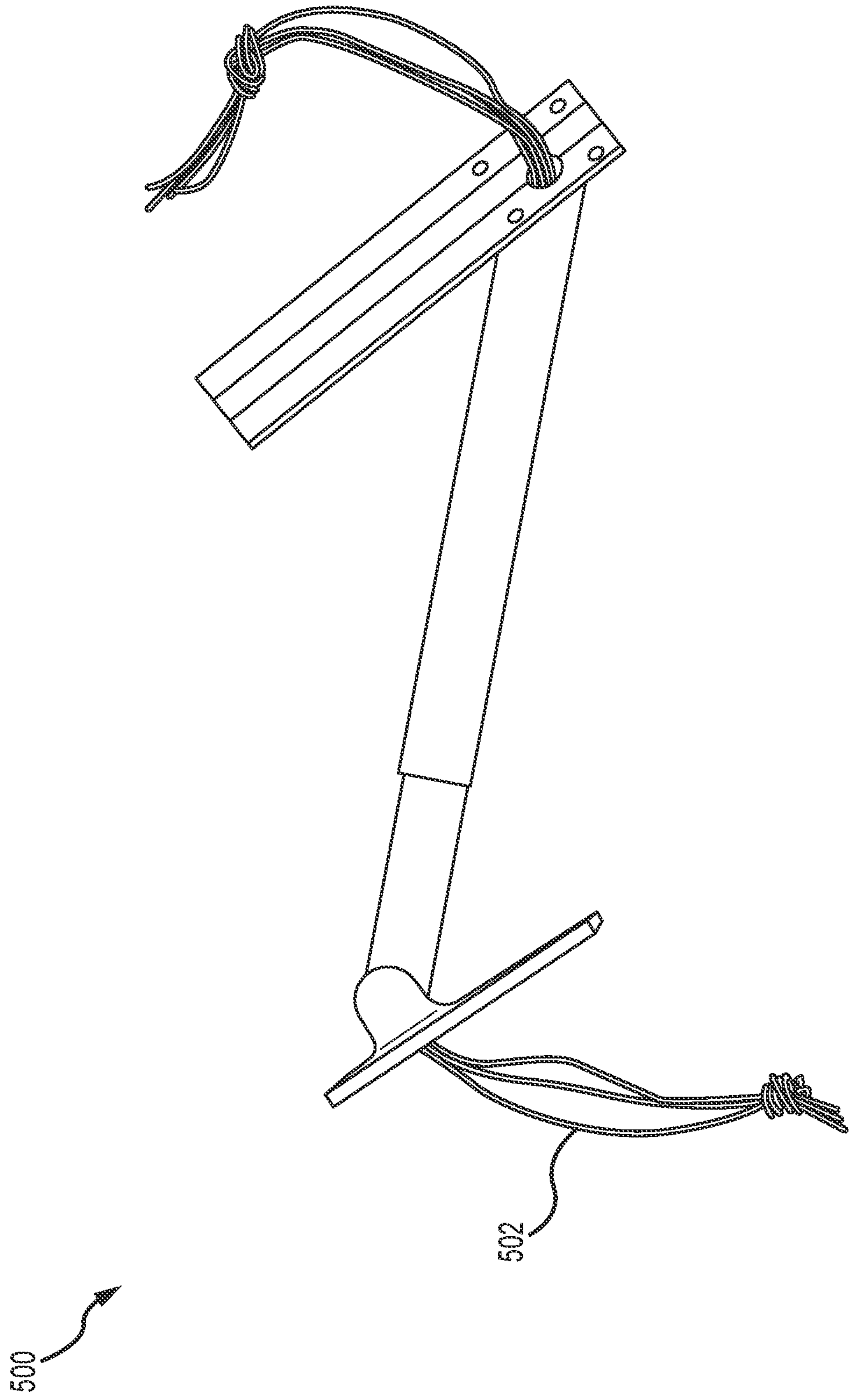
FIG. 12 is a top plan view of another electrical linkage assembly.

FIG. 12 is a top plan view of another electrical linkage assembly 500. The electrical linkage assembly 500 may be the same or similar to the electrical linkage assembly 400 described with regards to FIGS. 10 and 11 and include telescoping link arms. In this example, the electrical wiring 502 is illustrated. In an example, the electrical wiring 502 may include four discrete wire strands and the electrical wiring 502 is flexible to accommodate movement of the window sash. It should be appreciated that other electrical wiring configurations are also contemplated herein. In an aspect, the electrical wire may be up to and including 20 gage wire, and the channels within the electrical linkage assembly that houses the electrical wire are sized to accommodate at least 10 times the diameter of the electrical wire in cross-section size.

Figure 13:
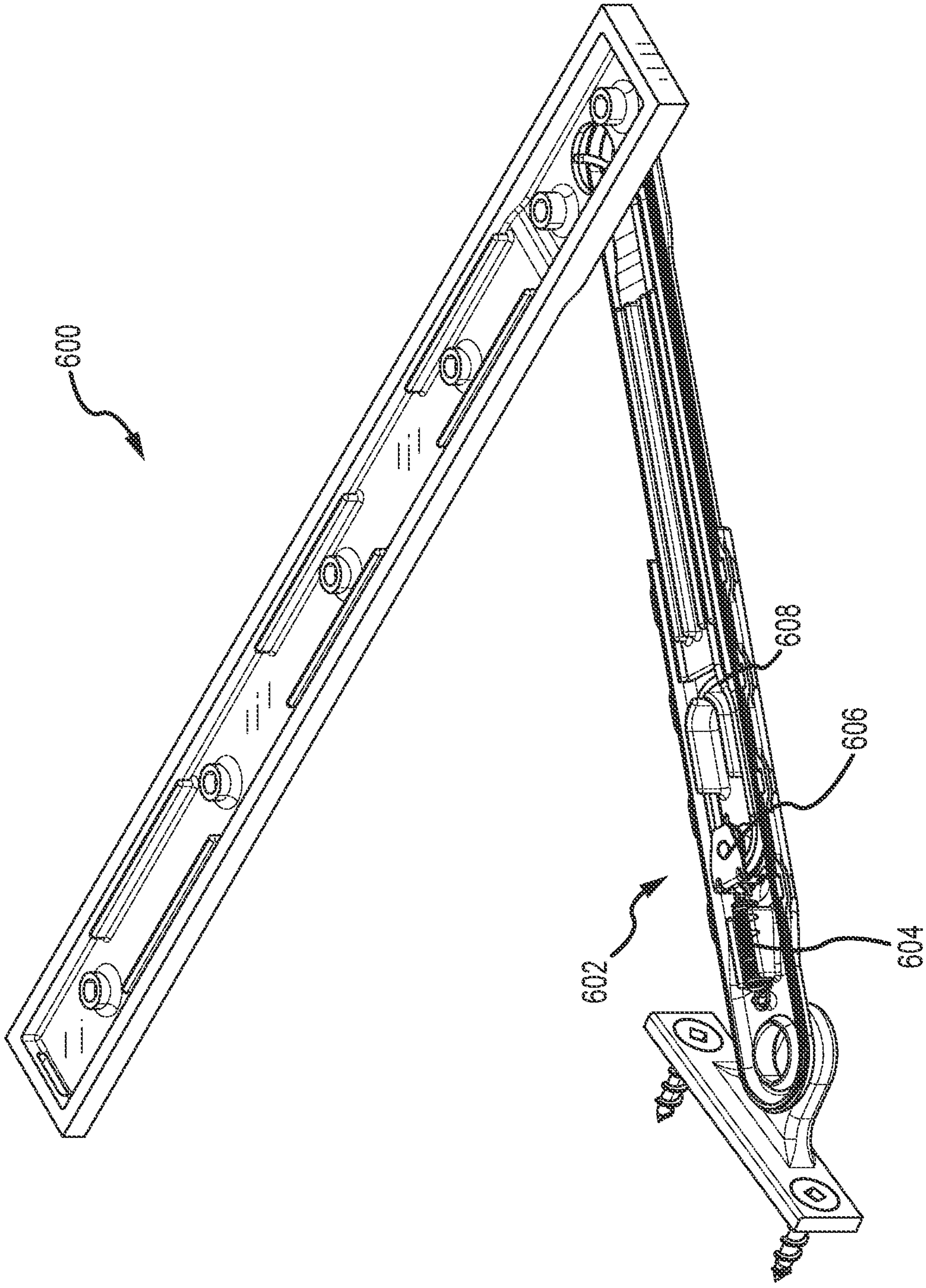
FIG. 13 is a perspective view of another electrical linkage assembly.

FIG. 13 is a perspective view of another electrical linkage assembly 600. The electrical linkage assembly 600 may be the same or similar to the electrical linkage assembly 400 described with regards to FIGS. 10 and 11 and include telescoping link arms. However, in this example, the slack loop 602 disposed within the link arms includes a spring 604 and a pulley 606 system that engages with electrical wires 608 so as to manage the excess length of the electrical wires 608 during movement of the telescoping link arms. The link arms may also define one or more interior channels for the electrical wires 608 as required or desired. As illustrated in FIG. 13, the top covers of the link arms are not shown.

Figure 14:
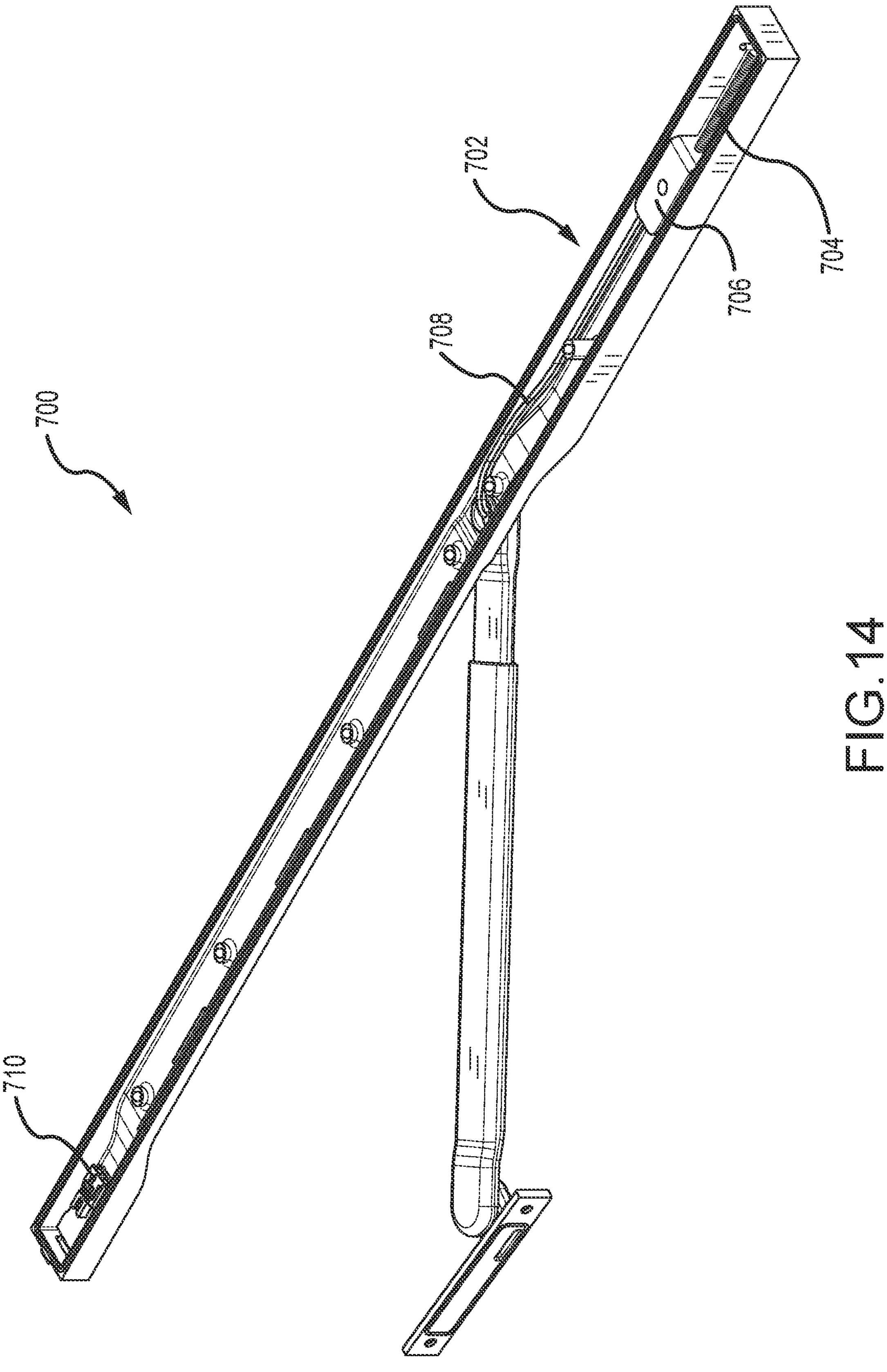
FIG. 14 is a perspective view of another electrical linkage assembly.

FIG. 14 is a perspective view of another electrical linkage assembly 700. The electrical linkage assembly 700 may be the same or similar to the electrical linkage assembly 400 described with regards to FIGS. 10 and 11 and include telescoping link arms. However, in this example, the slack loop 702 is disposed within the housing of the frame mount and includes a spring 704 and a pulley 706 system that engages with electrical wires 708 so as to manage the excess length of the electrical wires 708 during movement of the telescoping link arms. A connector 710 is also illustrated. In this example, the housing of the frame mount is elongated further in order to accommodate the slack loop 702.

Figure 15:
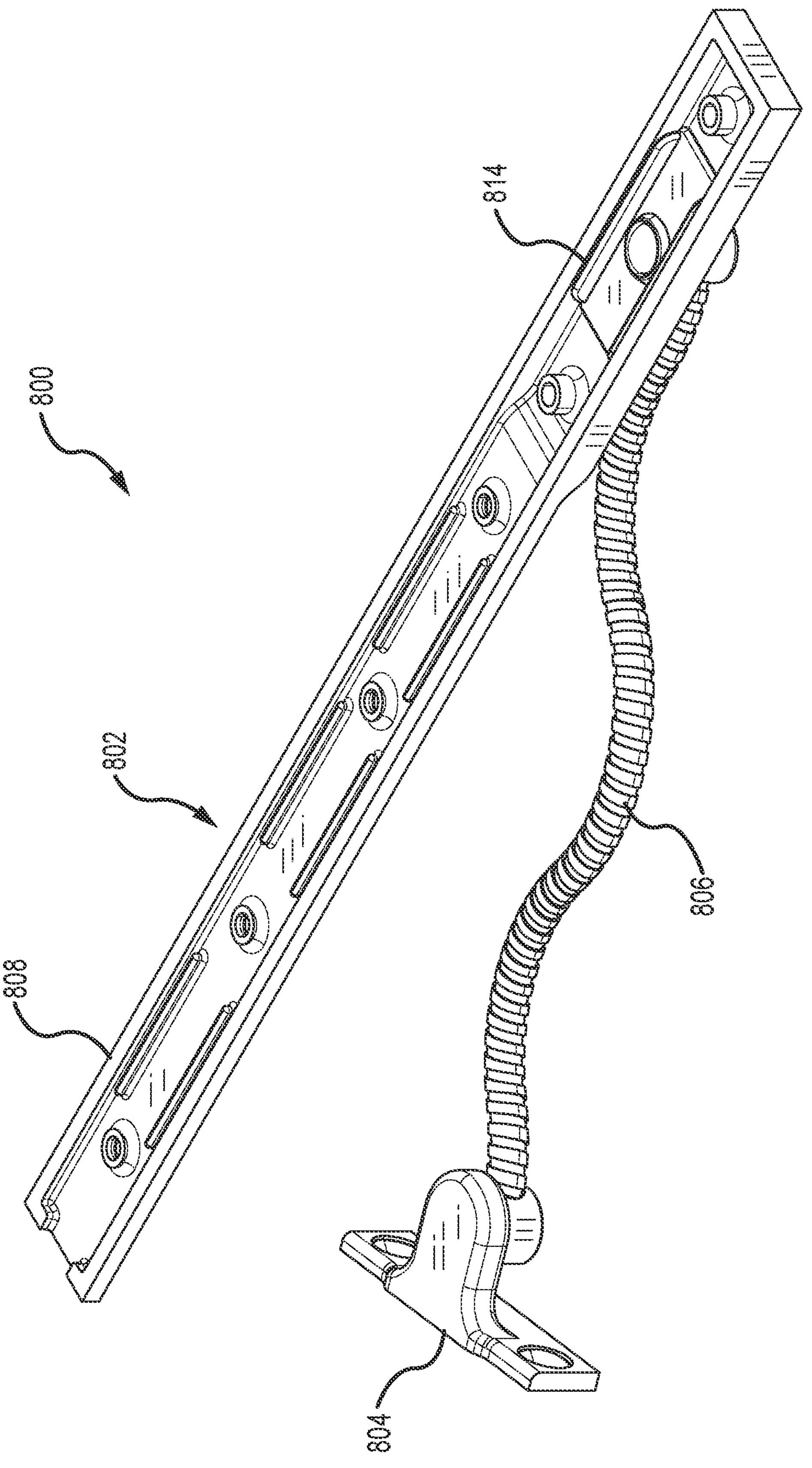
FIG. 15 is a perspective view of another electrical linkage assembly.
Figure 16:
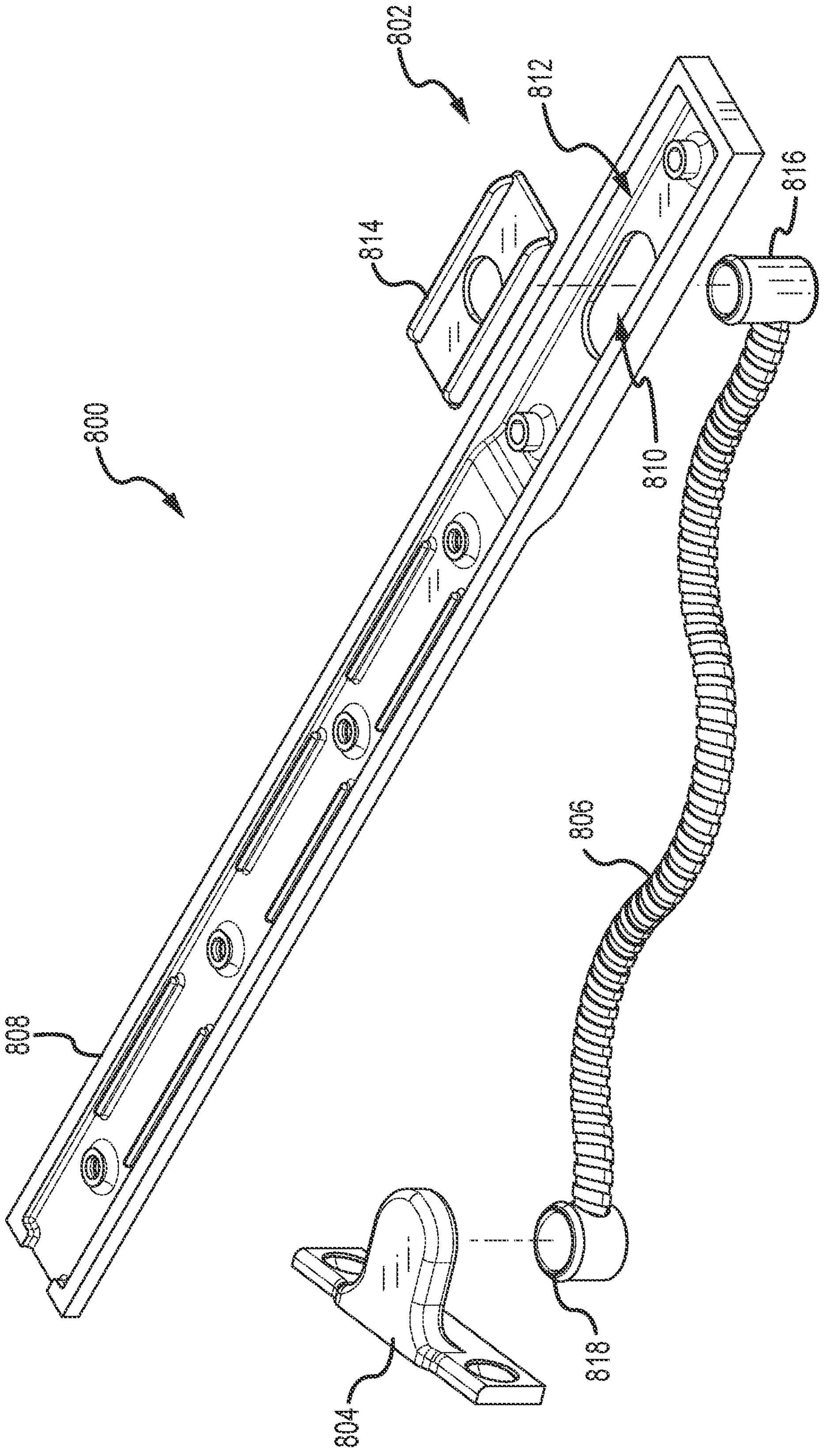
FIG. 16 is an exploded perspective view of the electrical linkage assembly shown in FIG. 15.

FIG. 15 is a perspective view of another electrical linkage assembly 800. FIG. 16 is an exploded perspective view of the electrical linkage assembly 800. Referring concurrently to FIGS. 15 and 16, electrical linkage assembly 800 includes a frame mount 802 configured to couple to the window frame, a sash mount 804 configured to couple to the window sash, and an armored cable 806 that defines an enclosed channel and allow one or more electrical wires to be routed therethrough. The frame mount 802 includes a housing 808 configured to attach to the window frame with one or more fasteners (not shown). The housing 808 includes an elongated opening 810 and a recess 812 configured to house a slidable track 814. The sash mount 804 has a body that is configured to attach to the window sash with one or more fasteners (not shown). The body forms an interior cavity so that the electrical wires can be routed into the window sash.

In this example, the armored cable 806 has a first end 816 that attaches to a pivot so as to pivotably couple to the slidable track 814 and an opposite second end 818 that attaches to a pivot so as to pivotably couple to the sash mount 804. The armored cable 806 is also substantially flexible to enable movement of the window sash while still providing protection to the electrical wires disposed therein. The ends 816, 818 of the armored cable 806 define the pivot points for the armored cable 806. In the example, each end 816, 818 is formed from an attachable cap which defines a hollow cylindrical protrusion so that the electrical wires can pass therethrough. A distal end of the hollow cylindrical protrusion includes a tapered flange so that both the sash mount 804 and the slidable track 814 can snap connect to the pivot points and rotate therearound. By forming the pivot points on the cap end, the length of the armored cable 806 can be sized based on the window assembly configuration.

Figure 18:
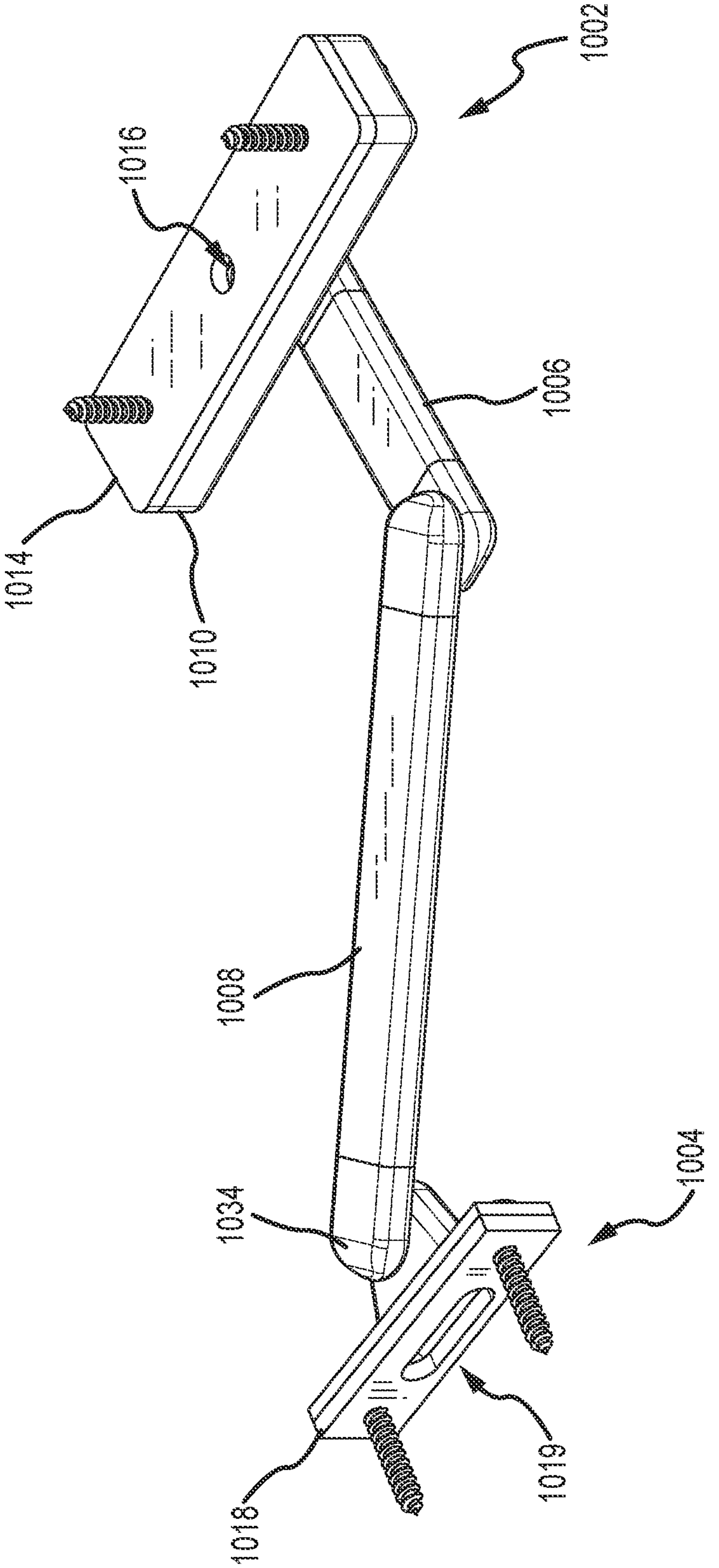
FIG. 18 is a perspective view of another electrical linkage assembly.
Figure 19:
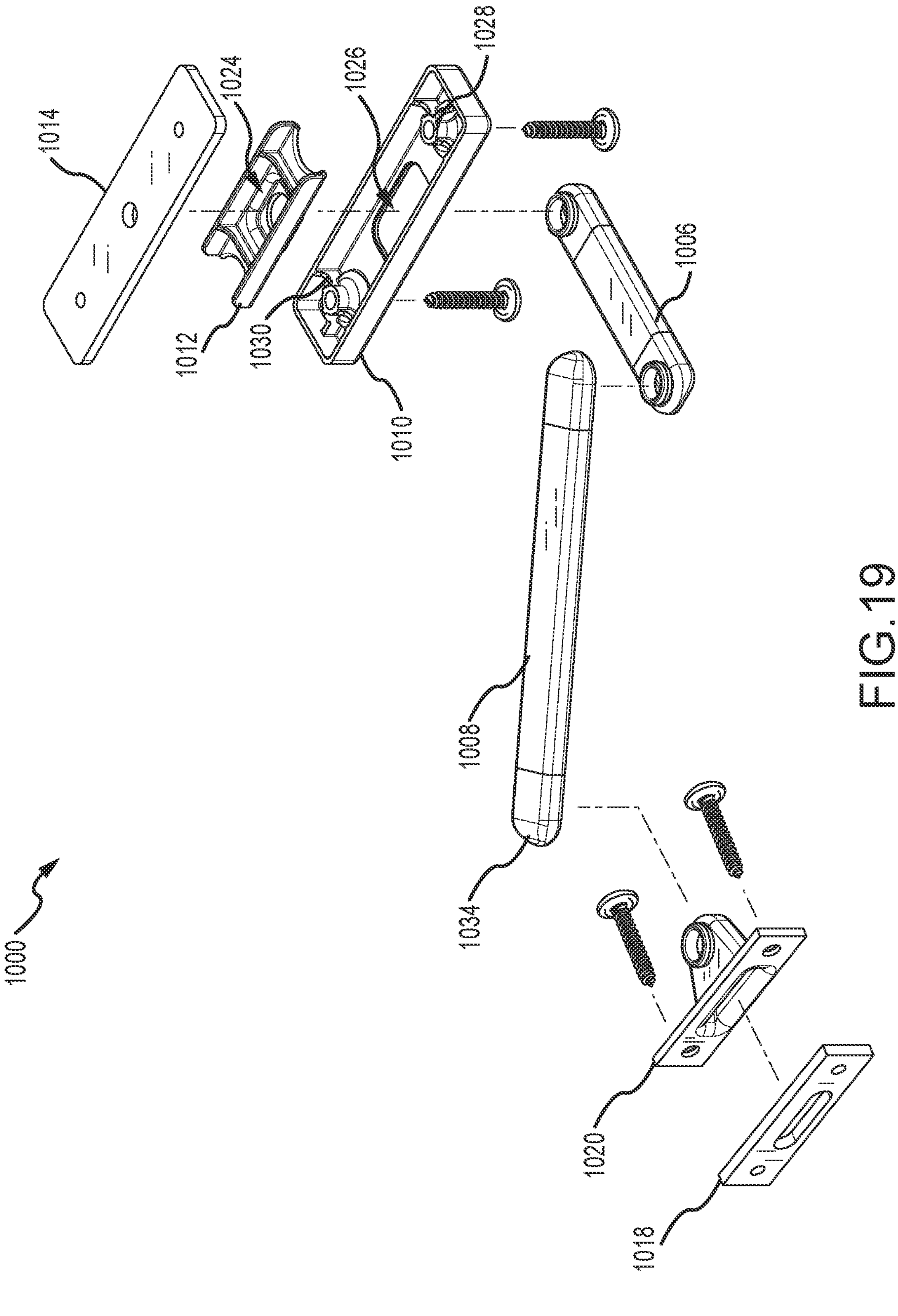
FIG. 19 is an exploded perspective view of the electrical linkage assembly shown in FIG. 18.
Figure 20:
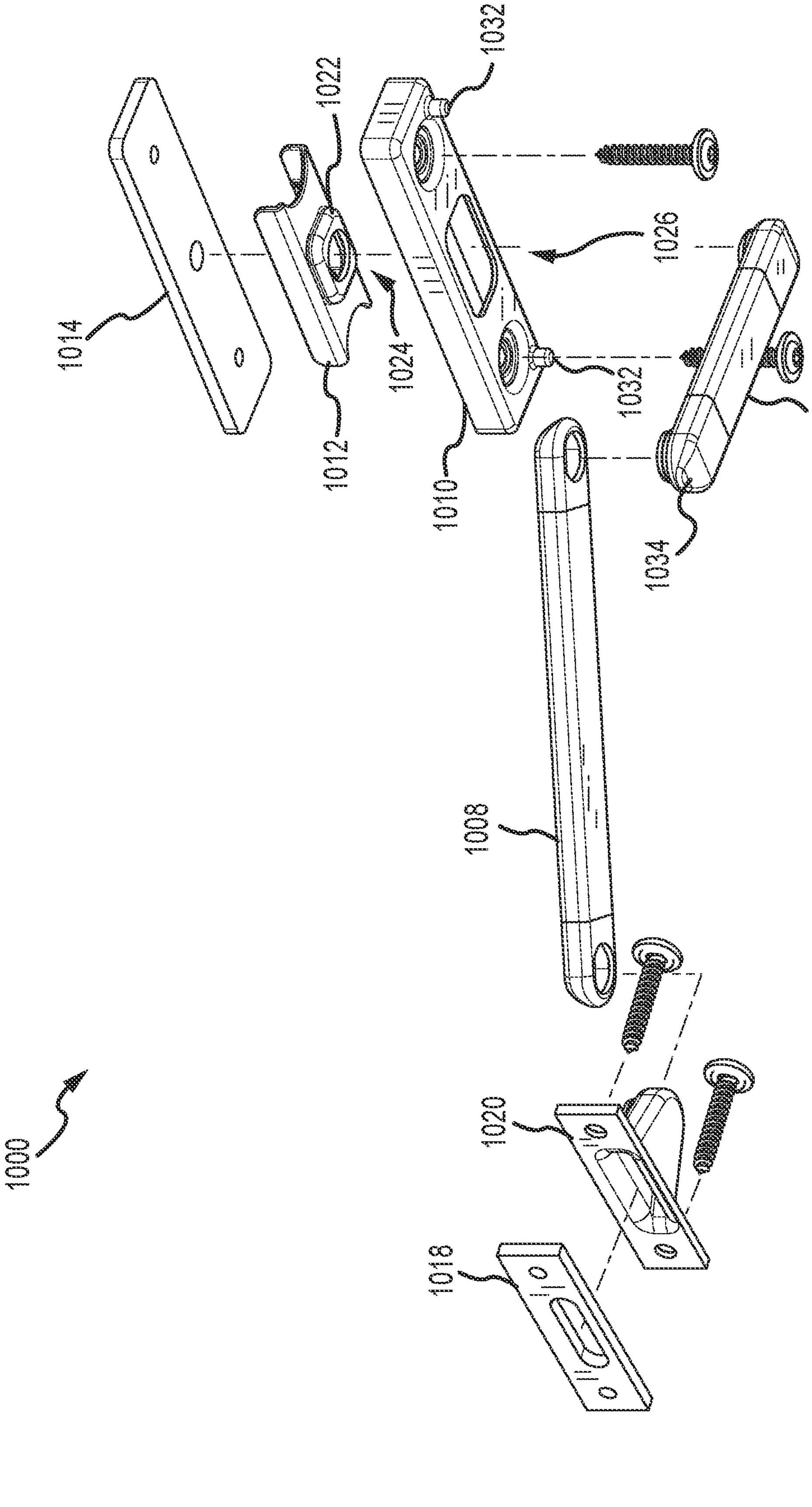
FIG. 20 is another exploded perspective view of the electrical linkage assembly shown in FIG. 18.

FIG. 18 is a perspective view of another electrical linkage assembly 1000. FIG. 19 is an exploded perspective view of the electrical linkage assembly 1000. FIG. 20 is another exploded perspective view of the electrical linkage assembly 1000. Referring concurrently to FIGS. 18-20, the electrical linkage assembly 1000 includes a frame mount 1002 and a sash mount 1004 with two link arms 1006, 1008 pivotably connected therebetween, and that operates similar to the electrical linkage assembly 200 (shown in FIGS. 4-7). In this example, the frame mount 1002 includes a housing 1010 and a slidable track 1012 (e.g., slider). A gasket 1014 is included to retain the slidable track 1012 within the housing 1010 and seal the frame mount 1002. The gasket 1014 includes a hole 1016 such that the electrical wires enter the frame mount 1002 from the top of the electrical linkage assembly 1000 and through the head jamb of the frame. The sash mount 1004 also includes a gasket 1018 with a hole 1019 that covers a flange 1020 of the sash mount body.

The slidable track 1012 includes a boss 1022 that has an aperture 1024 and is received at least partially within an elongate opening 1026 of the housing 1010. The slidable track 1012 is sized so that transverse movement within the housing 1010 is restricted, but longitudinal movement is allowed. The longitudinal ends of the slidable track 1012 are concave so that the slidable track 1012 can slide around fastener protrusions 1028 within the housing 1010. Adjacent the fastener protrusions 1028, the housing 1010 includes one or more wire cradles 1030 so that extra length of the electrical wire (not shown) can be wrapped within the housing 1010. The housing 1010 also includes a pair of stop projections 1032, one at each longitudinal end of the housing 1010.

The pivot joints of the electrical linkage assembly 1000 are the hollow cylindrical projections and apertures as described above. The first and second link arms 1006, 1008 have end caps that define the pivot joints. In this example, an outer nose 1034 of each of the end caps is tapered inward so as to facilitate pivoting efficiencies and aid in routing of the electrical wires through the pivot joints.

Figure 21:
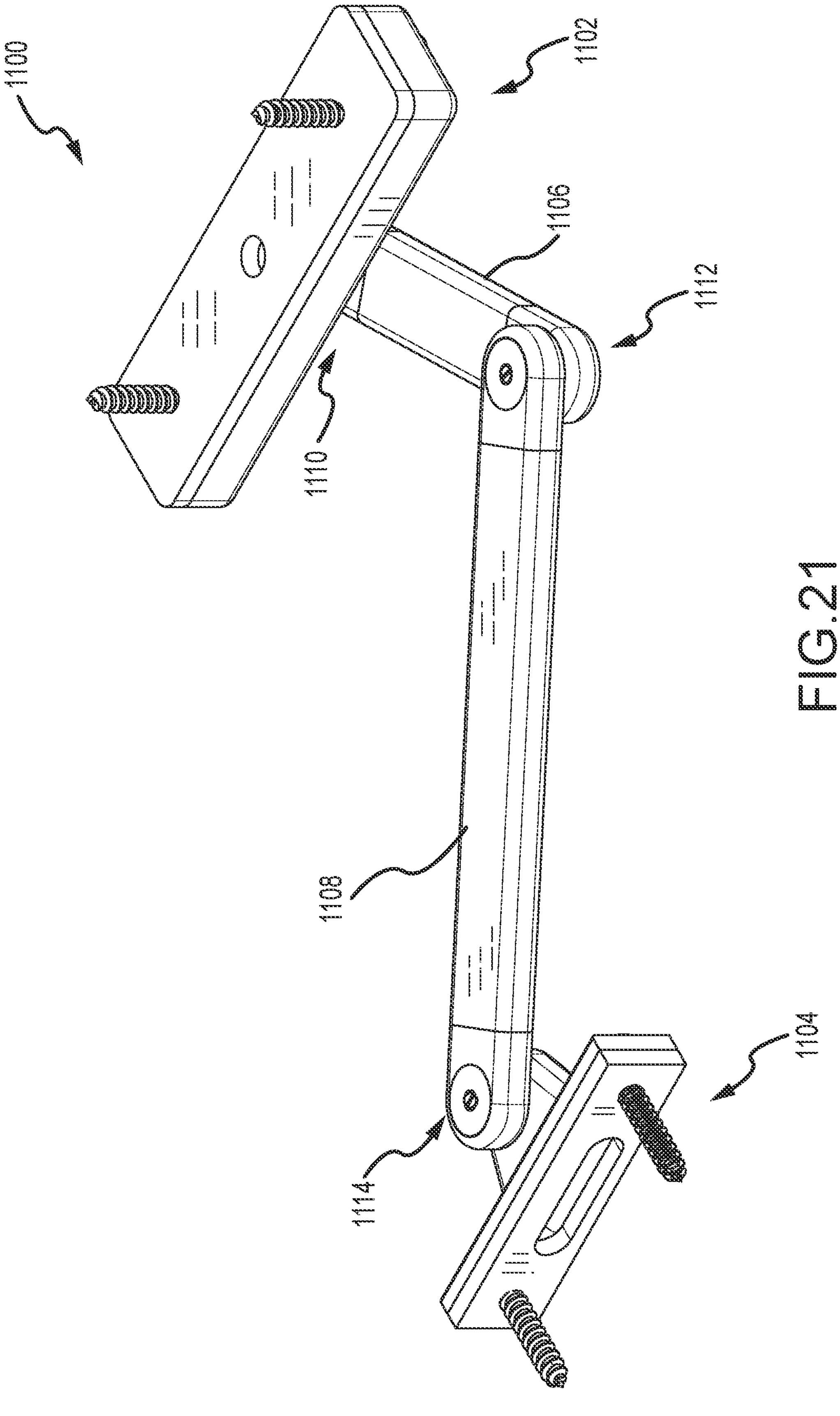
FIG. 21 is a perspective view of another electrical linkage assembly.

FIG. 21 is a perspective view of another electrical linkage assembly 1100. The electrical linkage assembly 1100 is similar to the electrical linkage assemblies 200 and 1000 described above. The electrical linkage assembly 1100 includes a frame mount 1102, a sash mount 1104, a first link arm 1106, and a second link arm 1108. The frame mount 1102 is pivotably coupled to the first link arm 1106 at a first pivot joint 1110, the first and second link arms 1106, 1108 are pivotably coupled at a second pivot joint 1112, and the second link arm 1108 is pivotably coupled to sash mount 1104 at a third pivot joint 1114. In this example, however, the pivot joints 1110, 1112, and 1114 are structurally reinforced to increase the connection strength.

Figure 22:
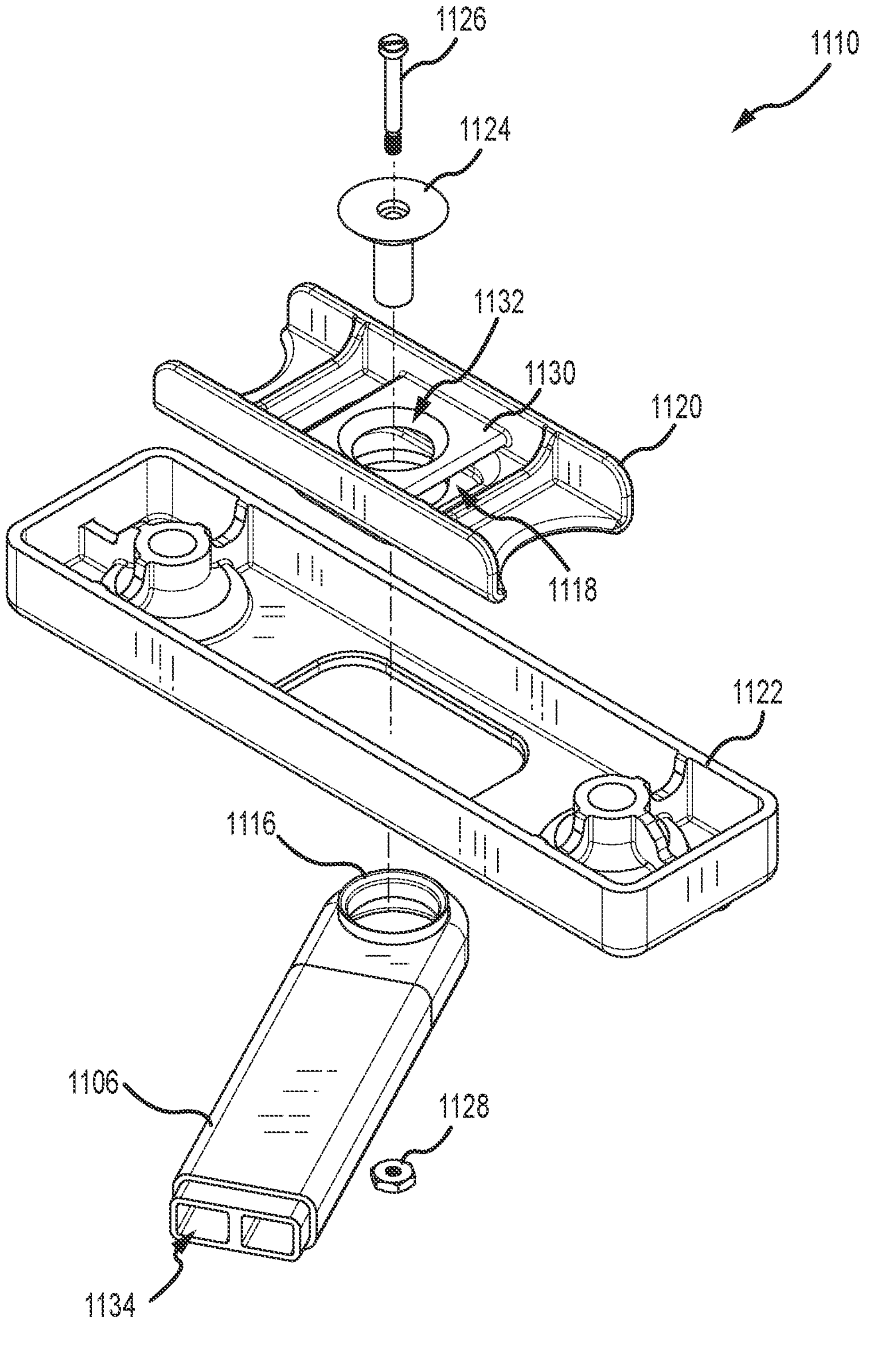
FIG. 22 is an exploded perspective view of a first pivot joint of the electrical linkage assembly shown in FIG. 21.

FIG. 22 is an exploded perspective view of the first pivot joint 1110. The end of the first link arm 1106 includes a hollow cylindrical projection 1116 that is configured to be received by an aperture 1118 of a slidable track 1120 that is received at least partially within a housing 1122. In the example, the hollow cylindrical projection 1116 does not include a flange for retention in the aperture 1118. Rather, a spool 1124 having an enlarged head extends through the pivot axis of the pivot joint 1110. The spool 1124 increases the strength of the pivot joint. The spool 1124 is secured at the pivot joint 1110 by a bolt 1126 and a nut 1128 extending through the center of the spool 1124. The nut 1128 may be secured on the bottom side of the first link arm 1106 on the cap and within a recess. The slidable track 1120 has a wall 1130 with a hole 1132 that extends over the boss and the aperture 1118 so as to support the enlarged head of the spool 1124. The spool 1124 has a smaller diameter than the hollow cylindrical projection 1116 so that the electrical wires can extend through the first pivot joint 1110 adjacent the spool 1124. In an aspect, the spool 1124 may be a metal component so as to provide increased strength.

The body of the first link arm 1106 has two discrete channels 1134 defined therein so as to separate the electrical wires as required or desired. The second link arm 1108 (shown in FIG. 21) may have a similar construction. In other examples, the body of the link arms may include only a single larger interior channel as required or desired.

Figure 23:
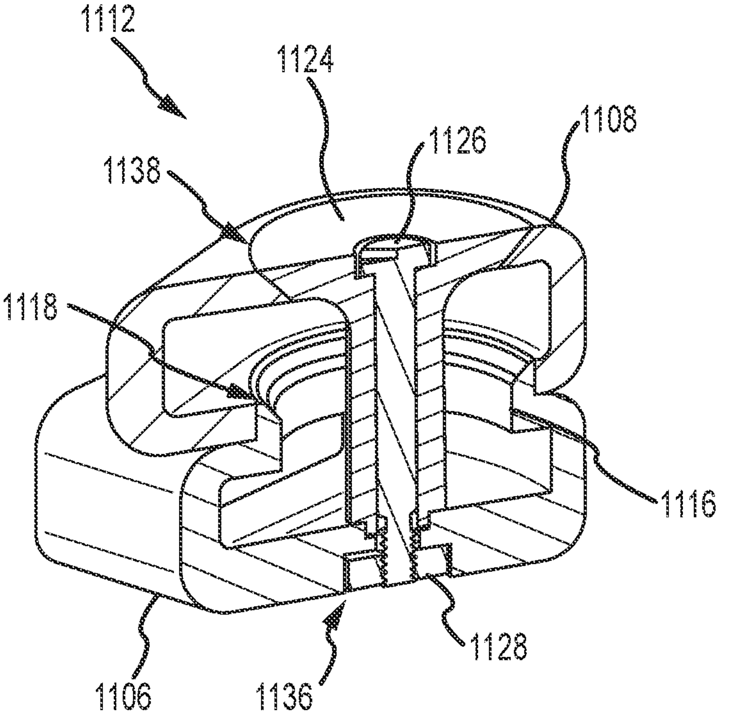
FIG. 23 is a cross-sectional perspective view of a second pivot joint of the electrical linkage assembly shown in FIG. 21.

FIG. 23 is cross-sectional perspective view of the second pivot joint 1112. The end cap of the first link arm 1106 is on the bottom and includes the hollow cylindrical projection 1116 without a flange that is received within the aperture 1118 defined in the end cap of the second link arm 1108 that is positioned on top. The bottom surface of the first link arm 1106 defines a recess 1136 to receive the nut 1128 of the reinforcement. The spool 1124 extends through the top of the second link arm 1108 at an opening 1138 that receives the enlarged head. This configuration enables the spool 1124 to be inserted from the top and secured by the bolt 1126 and the nut 1128 from the exterior. Additionally, the open path for the electrical wires are maintained through the pivot joint.

Figure 24:
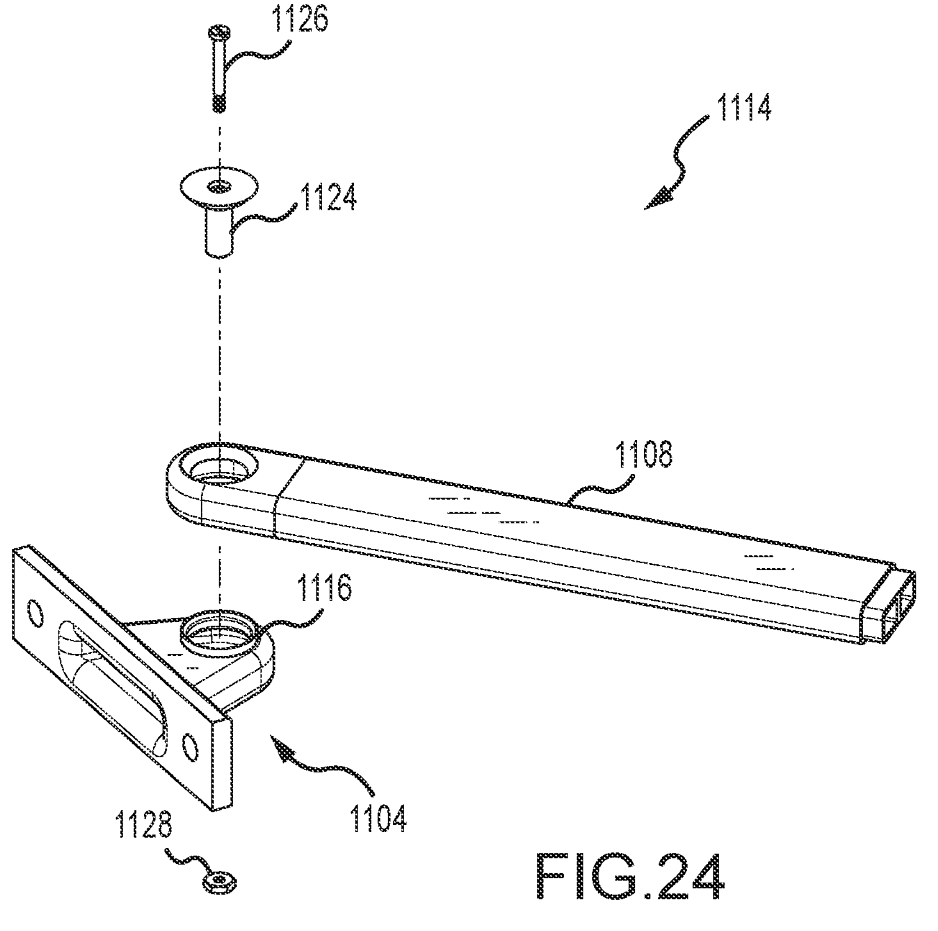
FIG. 24 is an exploded perspective view of a third pivot joint of the electrical linkage assembly shown in FIG. 21.

FIG. 24 is an exploded perspective view of the third pivot joint 1114. The hollow cylindrical projection 1116 is formed on the sash mount 1104 with the end of the second link arm 1108 positioned above. The spool 1124, bolt 1126, and nut 1128 reinforce the pivot joint as described above. By forming each of the pivot joints similarly, assembly efficiencies of the electrical linkage assembly are facilitated.

Figure 25:
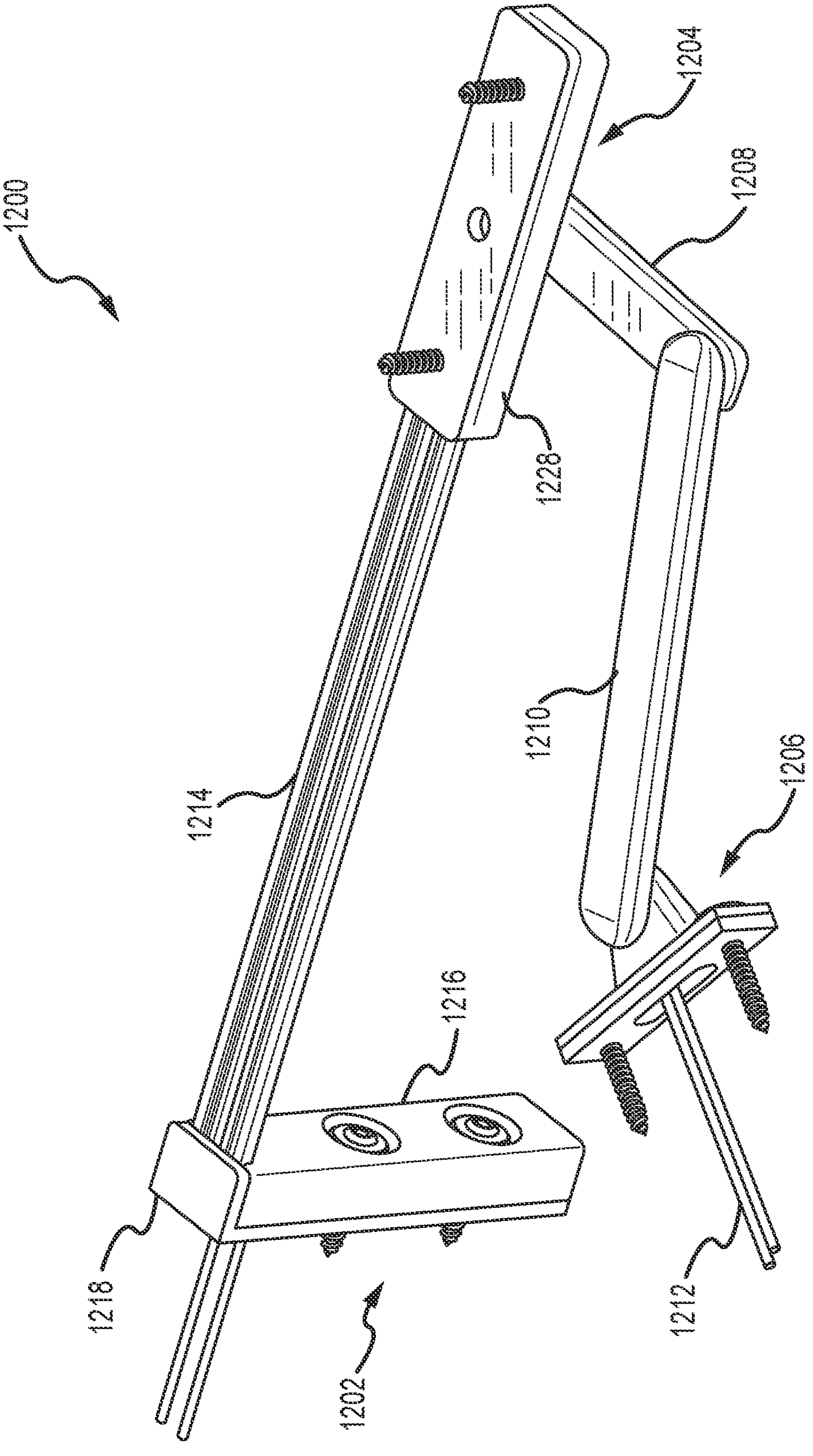
FIG. 25 is a perspective view of another electrical linkage assembly.
Figure 26:
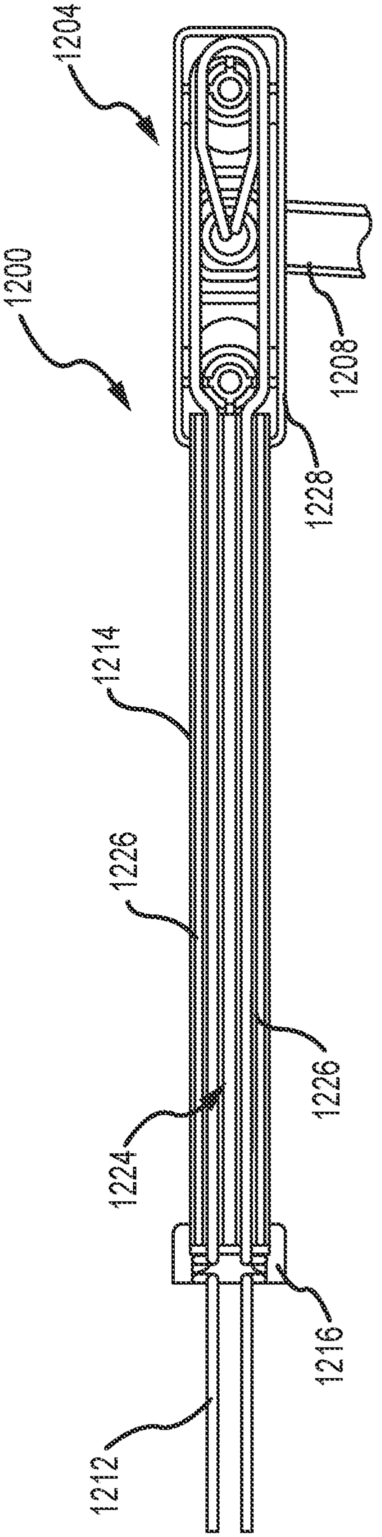
FIG. 26 is a partial top view of the electrical linkage assembly shown in FIG. 25.
Figure 27:
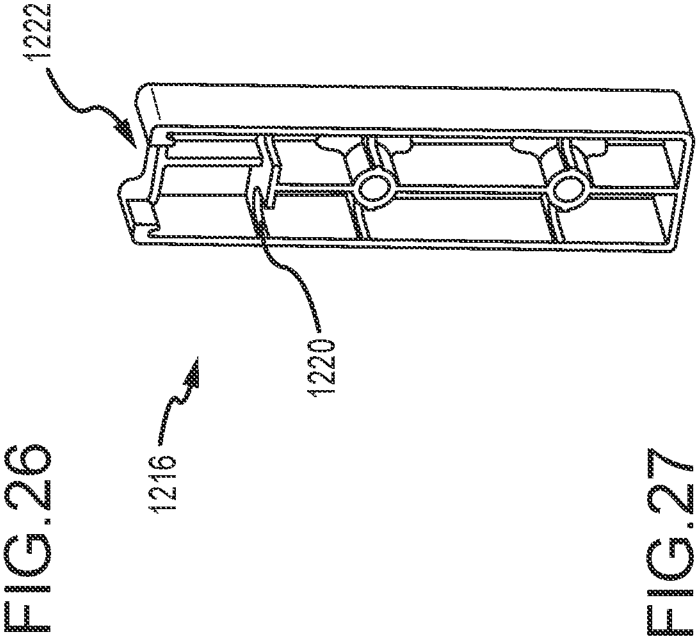
FIG. 27 is a perspective view of a side jamb mount of the electrical linkage assembly shown in FIG. 25.

FIG. 25 is a perspective view of another electrical linkage assembly 1200. FIG. 26 is a partial top view of the electrical linkage assembly 1200. FIG. 27 is a perspective view of a side jamb mount 1202 of the electrical linkage assembly 1200. Referring concurrently to FIGS. 25-27, the electrical linkage assembly 1200 includes a frame mount 1204, a sash mount 1206, a first link arm 1208, and a second link arm 1210, and similar to the examples described above so that one or more electrical wires 1212 can extend therethrough. In this example, however, the electrical wires 1212 extend from a side rail of the window frame, and as such, the electrical linkage assembly 1200 also includes the side jamb mount 1202 configured to mount to the side rail and a frame conduit 1214 that extends between the side jamb mount 1202 and the frame mount 1204.

The side jamb mount 1202 includes a housing 1216 and a gasket 1218. The electrical wires 1212 enter through the gasket 1218 and extend vertically through the housing 1216 while being supported by one or more cable cradles 1220. The top of the housing 1216 includes a notch 1222 that allows a portion of the frame conduit 1214 to couple to the side jamb mount 1202 and enable the electrical wires 1212 to extend from the housing 1216. This configuration allows for the electrical wires 1212 to extend from the side rail of the window frame while positioning the frame mount 1204 on the header jamb for operation. The electrical wires 1212 may include a connector (not show, but similar to the connector 414 shown in FIG. 11) terminating the ends of the electrical wires 1212.

The frame conduit 1214 can be formed with a plurality of discrete channels 1224 formed on the top side of the frame conduit 1214 and that are configured to receive the electrical wires 1212. The bottom side of the frame conduit 1214 may be planar to blend into the window frame. In an example, the channels 1224 may have a seal 1226 so as to environmentally seal the wires therein. A housing 1228 of the frame mount 1204 is coupled to the other end of the frame conduit 1214 and may also include a notch that receives the frame conduit 1214. As shown in FIG. 26, the electrical wires 1212 can extend within the housing 1228 for wire management in addition to extending through the pivot joint. In the example, the side jamb mount 1202 extends in a vertical direction while the frame mount 1204 extends in a horizontal direction so as to capture and protect the electrical wires 1212 and not interfere with the window sash operation.

The materials utilized in the manufacture of the electrical linkage assembly components described herein may be those typically utilized for window component manufacture, e.g., zinc, steel, aluminum, brass, stainless steel, etc. Molded plastics, such as PVC, polyethylene, etc., may be utilized for the various components. Material selection for most of the components may be based on the proposed use of the electrical linkage assembly. Appropriate materials may be selected for mounting systems used on particularly heavy panels, as well as on hinges subject to certain environmental conditions (e.g., moisture, corrosive atmospheres, etc.).

References in the specification to "one example," "an example," "an illustrative example," "an aspect," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurement techniques utilized herein. To the extent such terms may not be clearly defined or understood by one having skill in the art, the term "about" shall mean plus or minus ten percent.

While there have been described herein what are to be considered exemplary and preferred examples of the present technology, other modifications of the technology will become apparent to those skilled in the art from the teachings herein. For example, components and concepts from one example can be combined and/or substituted with components and concepts from other examples. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An electrical linkage assembly for a window sash mounted in a window frame, the electrical linkage assembly comprising:
- a frame mount comprising:
  - a housing configured to couple to the window frame and defining a longitudinal axis, wherein an elongated opening extending along the longitudinal axis is defined by the housing, and wherein the housing includes one or more stop projections;
  - a track disposed at least partially within the housing proximate the elongated opening, the track slidable relative to the housing along the longitudinal axis;
- a sash mount configured to couple to the window sash and defining an interior cavity;
- a first link arm having a first end pivotably coupled to the track of the frame mount forming a first pivot joint and a second end, wherein the one or more stop projections extend into a path of travel of the first link arm to define a pivot stop;
- a second link arm having a first end pivotably coupled to the second end of the first link arm forming a second pivot joint and a second end pivotably coupled to the sash mount forming a third pivot joint; and
- one or more electrical wires extending from the frame mount, through the first and second link arms and each of the first, second, third pivot joints, fully enclosed therein, and out of the interior cavity of the sash mount.

2. The electrical linkage assembly of claim 1, wherein each of the first, second, and third pivot joints include a hollow cylindrical protrusion received at least partially within an aperture and forming a hollow path therein for the one or more electrical wires.

3. The electrical linkage assembly of claim 2, wherein a distal end of each of the hollow cylindrical protrusions defines a flange that snap-fits to the aperture and is freely rotatably around a pivot axis.

4. The electrical linkage assembly of claim 1, wherein each of the first, second, and third pivot joints are parallel to each other.

5. The electrical linkage assembly of claim 1, wherein the first pivot joint is slidable relative to the housing.

6. The electrical linkage assembly of claim 1, further comprising a connector terminating one or more ends of the one or more electrical wires.

7. The electrical linkage assembly of claim 1, wherein the first link arm has a different length than the second link arm.

8. The electrical linkage assembly of claim 1, wherein the first link arm is disposed on a different horizontal plane than the second link arm.

9. The electrical linkage assembly of claim 1, wherein the housing defines at least one cable cradle for the one or more electrical wires.

10. An electrical linkage assembly comprising:
- a frame mount comprising:
  - a housing defining a longitudinal axis, wherein an elongated opening is defined within the housing and elongated along the longitudinal axis; and
  - a slider disposed at least partially within the housing and slidable relative to the housing along the longitudinal axis, the slider having a boss received at least partially within the elongated opening of the housing such that longitudinal sliding movement of the slider is bounded by the housing;
- a sash mount;
- a first link arm having a first end and an opposite second end; and
- a second link arm having a first end and an opposite second end, wherein the first link arm is pivotably connected between the boss of the slider and the second link arm, and the second link arm is pivotably connected between the first link arm and the sash mount, such that an open path is formed from the frame mount to the sash mount, through the first and second link arms, and configured to receive at least one electrical wire, and wherein each pivot connection is formed from a hollow cylindrical protrusion received at least partially within an aperture and defining a pivot axis.

11. The electrical linkage assembly of claim 10, wherein each pivot connection is freely rotatable around the pivot axis.

12. The electrical linkage assembly of claim 10, wherein each pivot connection is reinforced with a spool extending along the pivot axis.

13. The electrical linkage assembly of claim 10, wherein the first and second ends of the first link arm include first end caps coupled to a first link arm body and the first and second ends of the second link arm include second end caps coupled to a second link arm body, the first and second end caps having one of the hollow cylindrical protrusion and the aperture.

14. The electrical linkage assembly of claim 13, wherein the first end caps are different than the second end caps.

15. The electrical linkage assembly of claim 13, wherein the first and second link arm bodies have two separate channels defined therein.

16. A window assembly comprising:
- a window frame;
- a window sash pivotably and translatably mounted to the window frame; and
- an electrical linkage assembly coupled between the window frame and the window sash for running one or more electrical cables between the window frame and the window sash, the electrical linkage assembly comprising:
  - a frame mount comprising:

a housing defining a longitudinal axis and fixed to the window frame with one or more fasteners, wherein the housing defines a recess; and a slider slidably disposed at least partially within the recess of the housing and captured between the housing and the window frame, wherein the slider is slidable along the longitudinal axis within the recess;

a sash mount;

a first link arm having a first end pivotably coupled to the slider of the frame mount forming a first pivot joint and a second end, the first pivot joint moveable along the longitudinal axis; and a second link arm having a first end pivotably coupled to the second end of the first link arm forming a second pivot joint and a second end pivotably coupled to the sash mount forming a third pivot joint.

17. The window assembly of claim 16, wherein the electrical linkage assembly further comprises a side jamb mount discrete from the frame mount and configured to receive at least a portion of the one or more electrical cables.

18. The window assembly of claim 16, wherein the housing includes one or more stop projections extending into a path of travel of the first link arm to define a pivot stop for the first pivot joint.

19. The window assembly of claim 16, wherein the frame mount is disposed above the first link arm and the sash mount is disposed below the second link arm.

* * * * *